United States Patent
Haas et al.

(10) Patent No.: US 6,196,117 B1
(45) Date of Patent: Mar. 6, 2001

(54) CONTINUOUS PRODUCTION TWO STACK BAKING APPARATUS

(75) Inventors: Franz sen. Haas, Vienna; Johann Haas, Klosterneuburg; Johann Sachsenhofer, Vienna, all of (AT)

(73) Assignee: Franz Haas Waffelmaschinen-Industrie Aktiengesellschaft, Vienna (AT)

( * ) Notice: Subject to any disclaimer, the term of this patent is extended or adjusted under 35 U.S.C. 154(b) by 0 days.

(21) Appl. No.: 09/423,494

(22) PCT Filed: May 11, 1998

(86) PCT No.: PCT/AT98/00122

§ 371 Date: Nov. 19, 1999

§ 102(e) Date: Nov. 19, 1999

(87) PCT Pub. No.: WO98/51157

PCT Pub. Date: Nov. 19, 1998

(30) Foreign Application Priority Data

May 9, 1997 (AT) .......................................... 789/97

(51) Int. Cl.[7] ................. A23L 1/00; A21B 5/02; A47J 37/00; A47J 37/01
(52) U.S. Cl. ................. 99/353; 99/372; 99/373; 99/374; 99/380; 99/427
(58) Field of Search ..................... 99/339, 340, 352–355, 99/372–379, 400, 381, 401, 443 R, 443 C, 444–450, 467, 476–479, 483; 126/21 A, 41 C, 41 R; 219/524, 521.478, 451.1, 243; 425/446, 595; 426/523, 231, 283, 496

(56) References Cited

U.S. PATENT DOCUMENTS

| 1,759,832 | * | 5/1930 | Banff ...................................... 99/378 |
| 1,814,942 | * | 7/1931 | Mabey .................................... 99/373 |
| 4,648,314 | * | 3/1987 | Plicht et al. ........................... 99/373 |
| 4,803,918 | * | 2/1989 | Carbon et al. ........................ 99/377 |

FOREIGN PATENT DOCUMENTS

| 714019 | 11/1941 | (DE) . |
| WO 95/26635 | 10/1995 | (WO) . |

* cited by examiner

*Primary Examiner*—Timothy F. Simone
(74) *Attorney, Agent, or Firm*—Herbert Dubno; Andrew Wilford

(57) ABSTRACT

An apparatus for baking thin-walled shaped bodies has a baking shaft defining adjacent up and down paths and a respective stack of pairs of cavity-forming baking plates in the shaft at each of the paths. A heater in the shaft heats the stacks between upper and lower ends thereof. A lower transporter conveys plates from the lower end of the down-path stack to the lower end of the up-path stack and an upper transporter conveys plates from the upper end of the up-path stack to the upper end of the down-path stack. Upper and lower fillers and strippers above the respective upper and lower transporter deposit a bakable preproduct on the plates and for removing a baked product from the plates. The plates are transferred from the downstream end of the lower transporter to the lower end of the up stack which is thus stepped upward, and are transferred from the lower end of the down stack to the upstream end of the lower transporter to step the down stack downward.

9 Claims, 13 Drawing Sheets

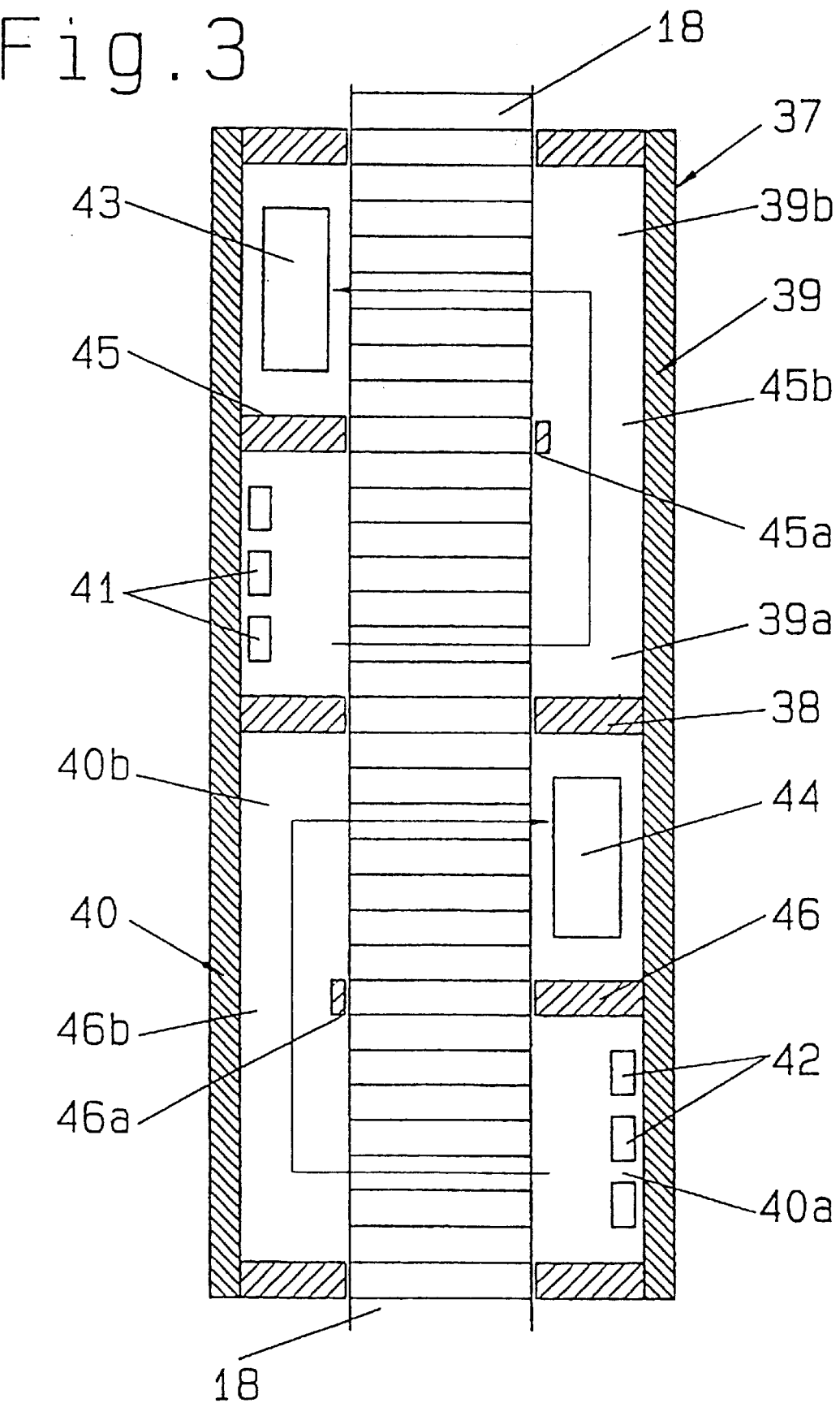

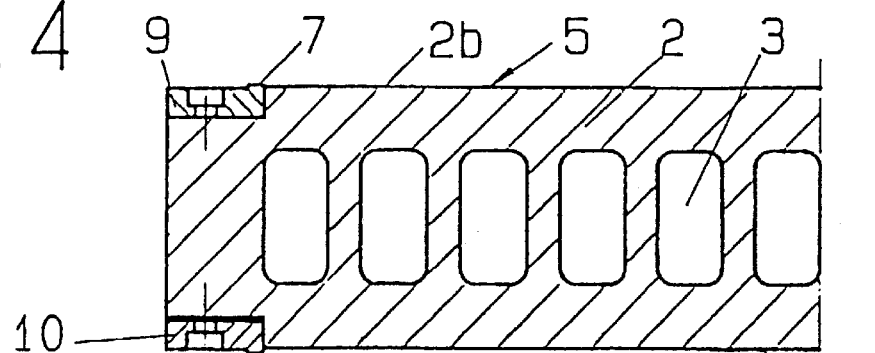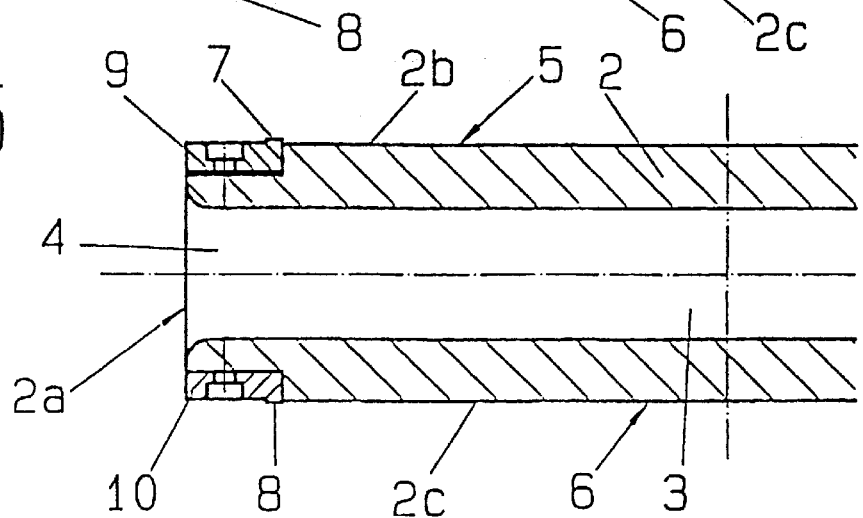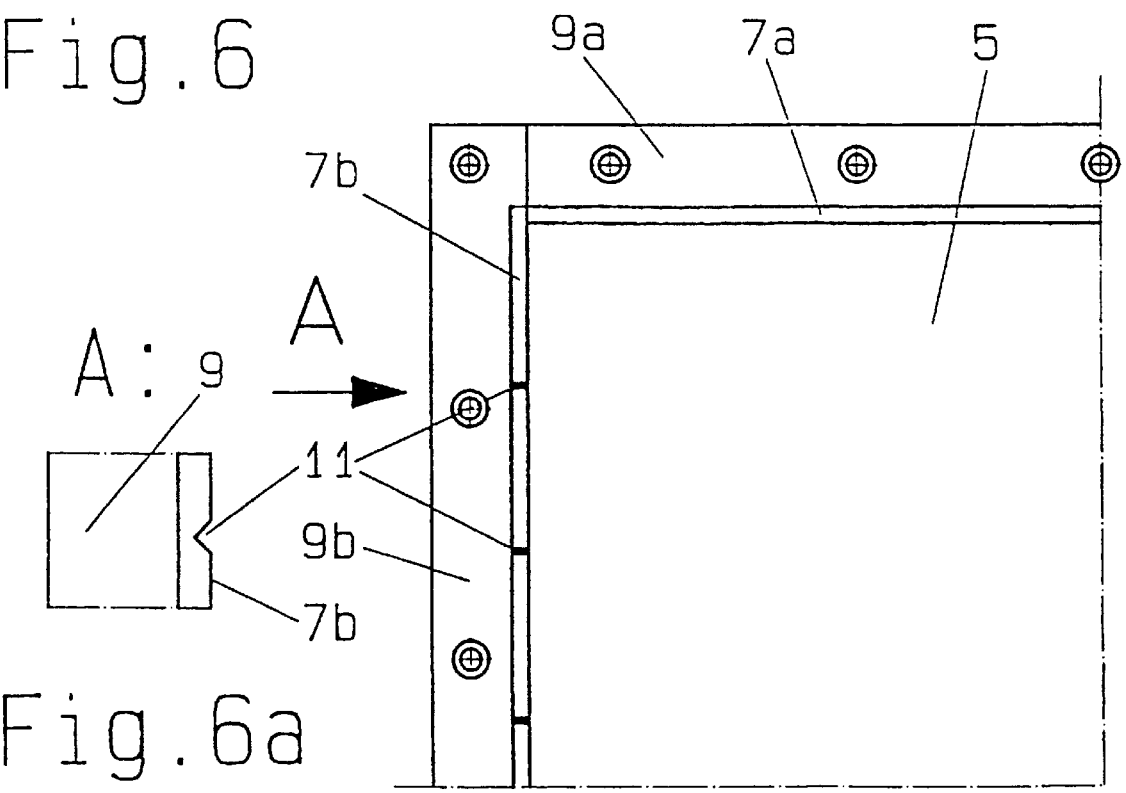

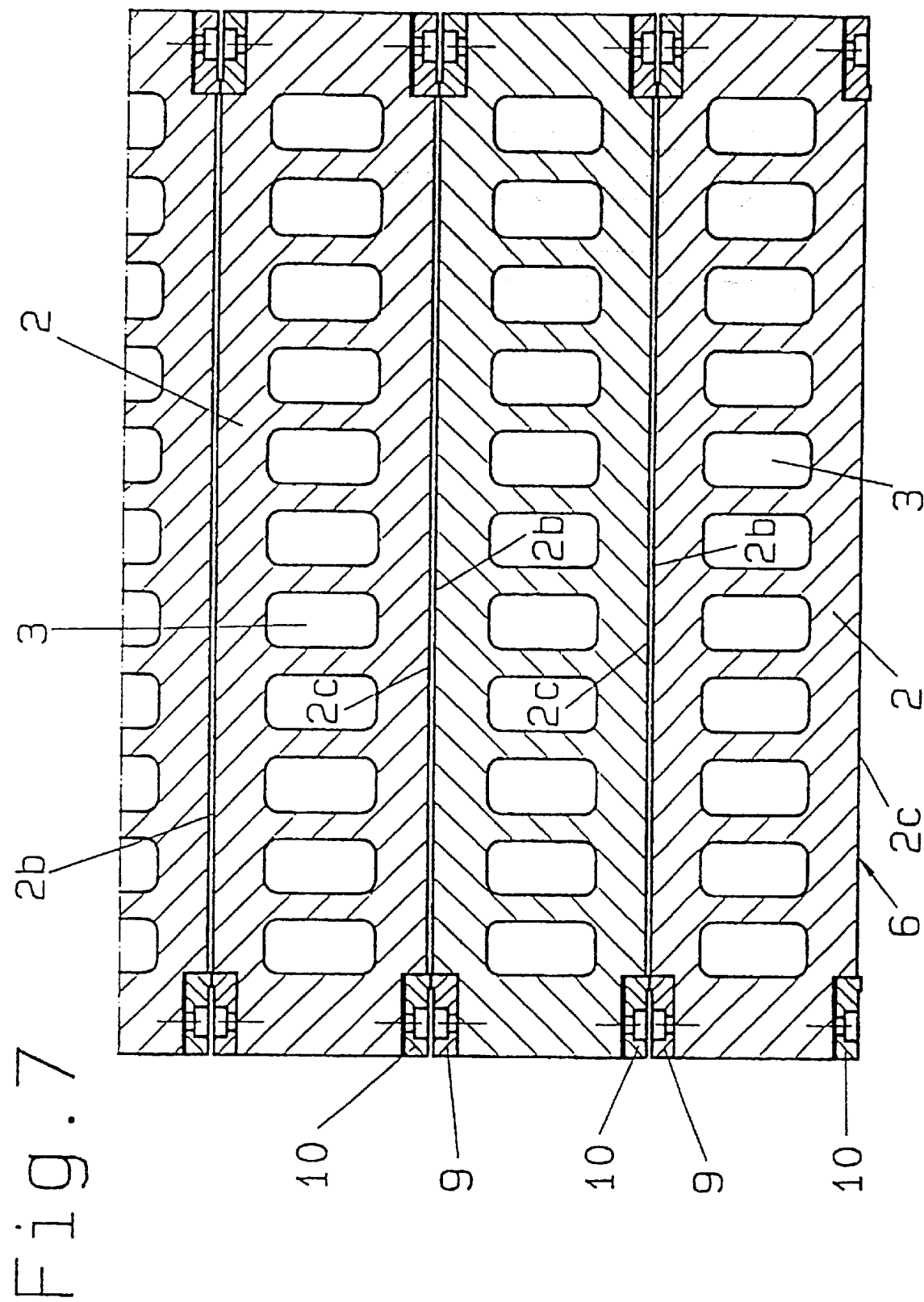

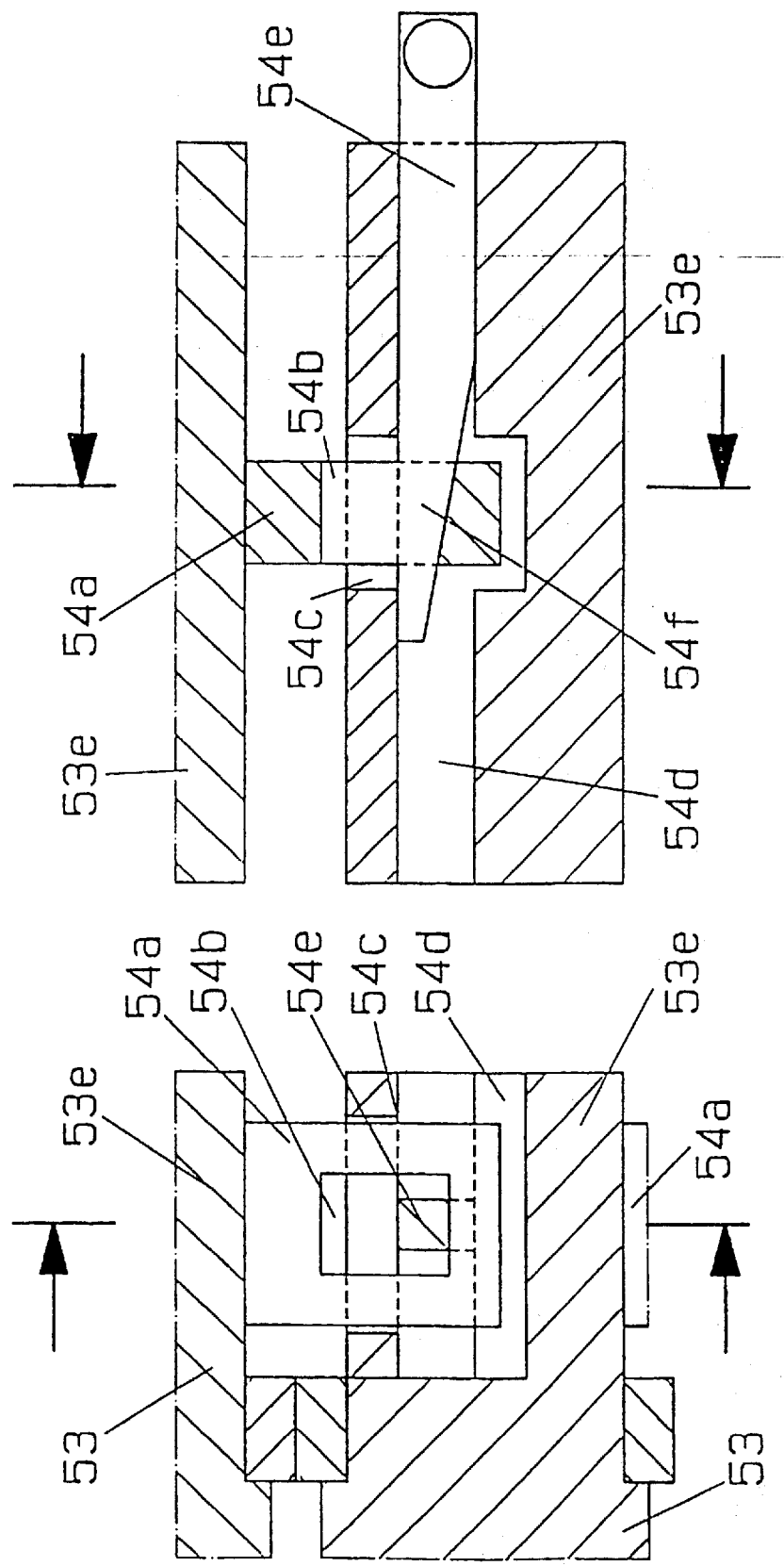

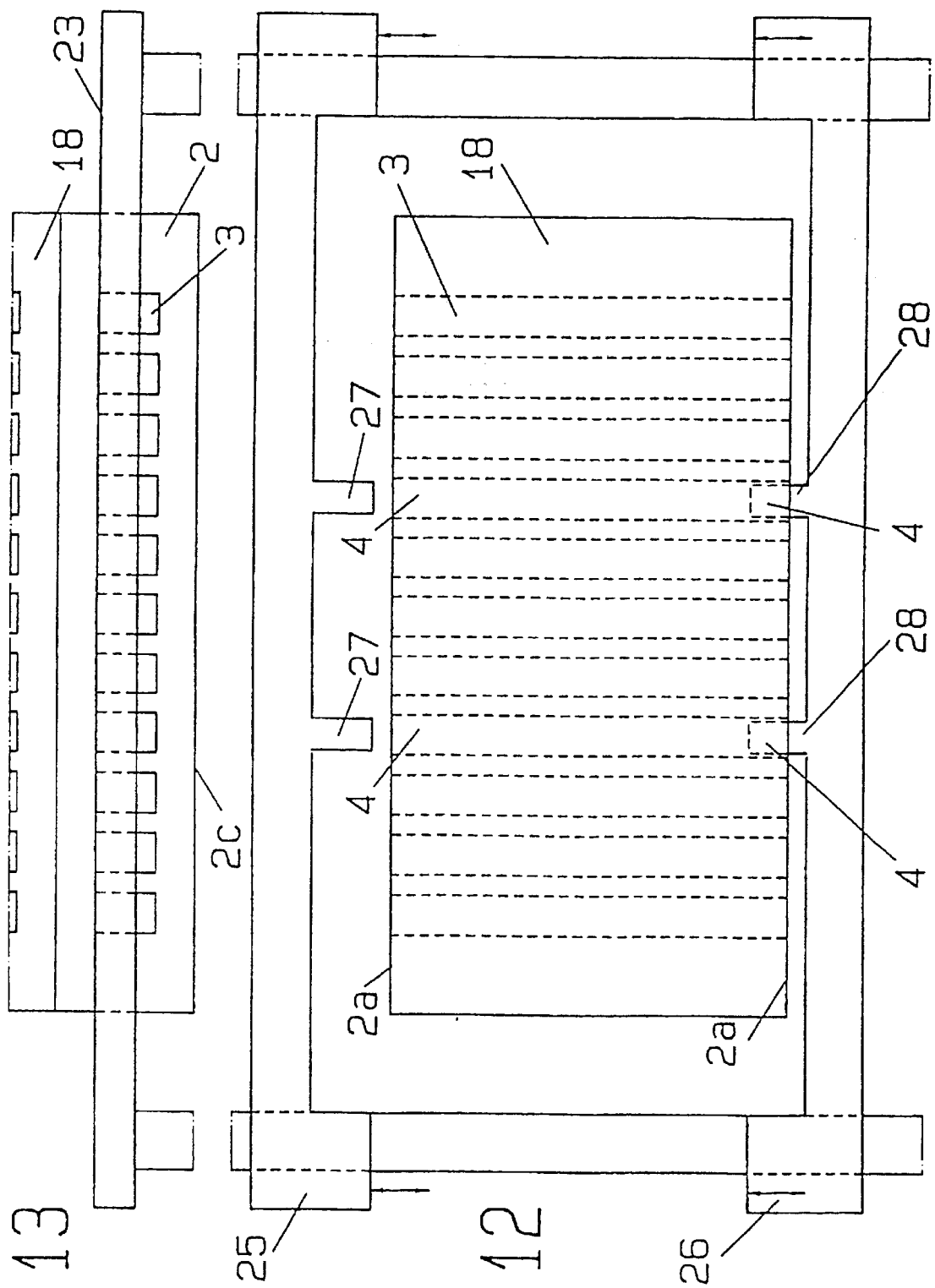

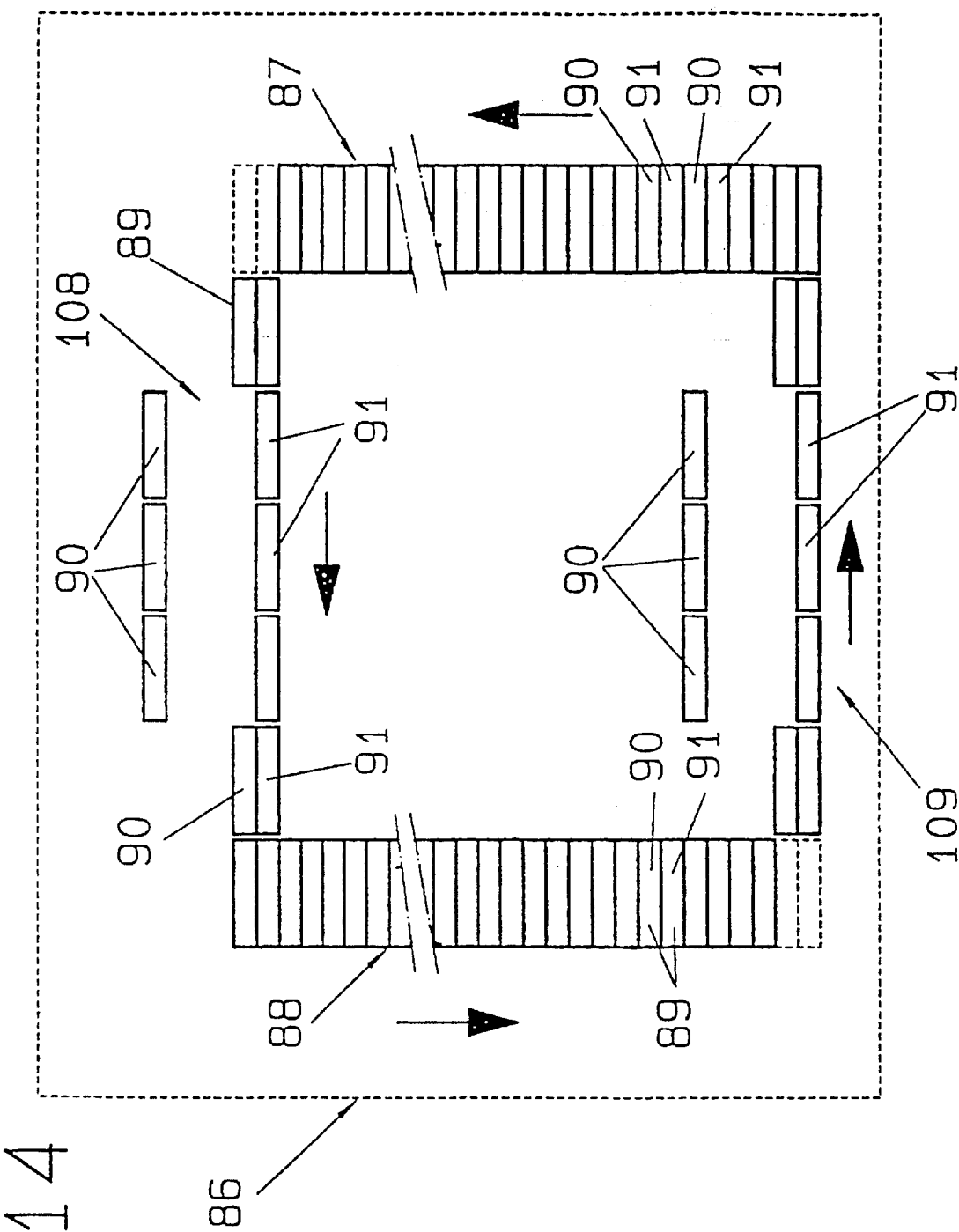

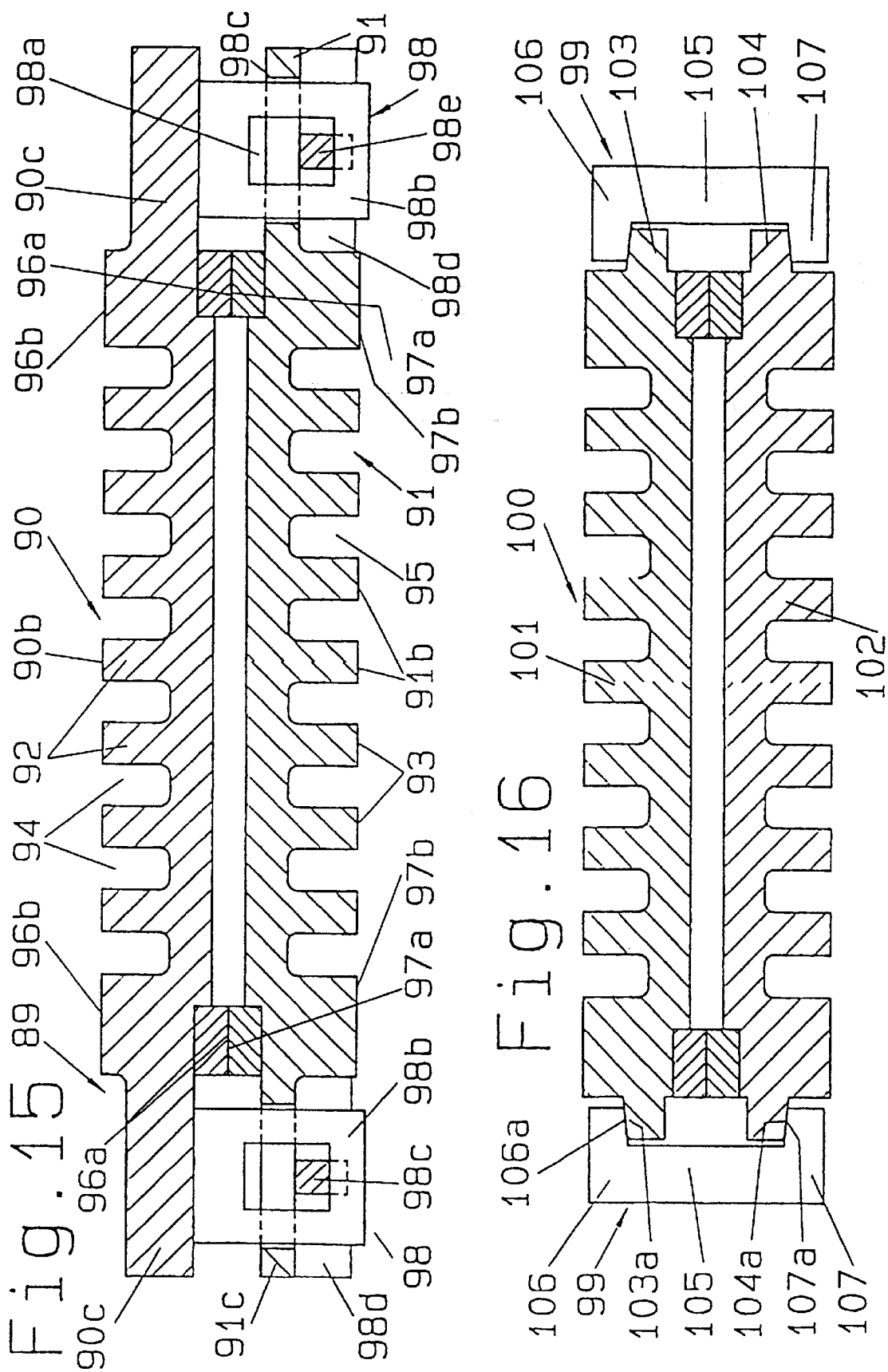

US 6,196,117 B1

CONTINUOUS PRODUCTION TWO STACK BAKING APPARATUS

CROSS REFERENCE TO RELATED APPLICATIONS

This application is the US national phase of PCT application PCT/AT98/00122 filed May 11, 1998 with a claim to the priority of Austrian patent application A789/97 itself filed May 9, 1997.

FIELD OF THE INVENTION

TECHNICAL FILED

The invention relates to baking ovens through which baking molds consisting of two opening and closing mold halves are transported, wherein in the open state pre-products are filled, which in the closed baking molds are transformed into thin-walled shaped products, whose configuration corresponds to the hollow space defined by a closed baking mold.

BACKGROUND OF THE INVENTION

As pre-products shapeless masses can be used, which harden in the closed baking molds, or shapeless masses which in the closed baking molds are baked into thin-walled shaped products. As shapeless baking masses for human consumption certain doughs can be used, for instance sugarless or sugar-containing wafer doughs, which according to the dough recipe, are baked into crisp, crunchy wafers or to soft wafers, or other baking doughs used in the production of sweet or non-sweetened bakery products. As shapeless baking masses it is also possible to use starch-based baking masses not suited for human consumption, which are baked in the form of decayable packaging trays or of other decayable starch-containing packaging products.

As pre-products it is also possible to use preshaped bodies to be integrated in the thin-walled shaped products to be produced, which are introduced in the molds together with the shapeless mass, or preshaped bodies which assume a different configuration in the closed molds. The preshaped bodies can be themselves thin-walled shaped products, which were made from shapeless masses.

In the known longitudinally arranged baking ovens for the production of thin-walled shaped bodies from shapeless masses, for the production of shaped bodies opening and closing mold halves are contained in 18–140 opening and closing baking tongs, whereby each mold with both its mold halves is received in the two tong halves of a baking tong. The baking tongs are connected in an endless chain, which runs continuously through the antechamber and subsequent baking space of the respective baking oven in one direction. When passing through the antechamber, the baking tongs are opened to open their respective baking molds, first in order to remove the respective thin-walled shaped body from the open baking mold, and than to introduce a measured amount of the shapeless mass in the opened baking mold. Subsequently the baking tongs are closed to close their respective baking molds. During the subsequent passage through the oven, the baking molds are heated and the shapeless mass enclosed in the closed baking molds is baked into thin-walled shaped bodies, while the baking molds are kept closed against the inner pressure generated inside them during baking.

In these baking ovens the longitudinally extending endless baking tong chain is arranged in two superimposed transport levels through the respective longitudinally extending baking space, and is guided from the one transport level to the other transport level at the rear end of the baking space and at the front end of the antechamber frontally connected to the baking space.

Each baking tong is designed as an externally actuatable machine, by means of which the therein contained baking mold is transported through the baking oven, opened and closed and kept closed. When passing through the antechamber, the baking mold is opened by means of its baking tong, kept open for a short time and then closed again. When passing through the baking space, the closed baking mold is kept closed by means of its baking tong. The endless baking tong chain is driven by a driving motor, which produces a continuous revolving motion of the baking tong chain. From this revolving motion in each baking tong the same motion sequence is induced, when in the antechamber they pass the respectively assigned control mechanisms, stationarily arranged in the antechamber, which in connection with the revolving motion of the baking tong chain produce each time the respective motion sequence of the baking tong, respectively of its parts.

When running though the antechamber the open baking tongs pass the product removal station, wherein the baked shaped bodies are removed from the opened baking molds and are discharged from the antechamber via the discharge station of the oven. After the product removal station, the opened baking tongs pass the loading station, wherein the measured amounts of the shapeless mass are introduced in the empty, open baking molds. During its travel through the longitudinally extending, horizontal baking space of the oven, the closed molds are heated in the closed baking tongs. In a gas-heated oven the baking molds are heated from the outside with hot gases, which are generated in the baking space of the oven and directed towards the baking tongs. In an electrically heated oven the baking molds are heated by means of the electric heating elements built into the tong halves of the baking tongs, which during their travel through the baking space are supplied with electric energy from an external source.

The thin-walled shaped bodies are produced in successive cycles, in the baking molds transported in cycle through the baking space by the baking tongs. Each baking cycle takes place in the respective baking mold during its travel from the loading station through the baking space to the product removal station. In each single baking cycle, in the loading station a shapeless mass is introduced into the baking mold previously opened by the baking tong, the baking mold is closed and kept closed by means of its baking tong, until it is opened again by means of its baking tong before it reaches the product removal station, and the thin-walled shaped body is removed from the open baking mold.

When the open baking mold is again transported by its baking tong to the loading station, then in this baking mold starts the next baking cycle for the production of a thin-walled shaped body.

In each baking cycle, during the baking process in the mold kept closed from the outside by the baking tong, the shapeless mass enclosed in the closed baking mold is distributed, made to rise and baked under pressure into a risen, thin-walled shaped body. The outer configuration of the resulting thin-walled shaped body is determined on its upper side by the surface configuration of the baking surface of the upper mold half and on its underside by the surface configuration of the baking surface of the lower mold half of the baking mold. The wall thickness of the resulting thin-walled shaped body is determined by the distance between these two mutually facing baking surfaces, when the mold is closed. The contour of the outer border of the resulting thin-walled shaped body is determined by the lateral limits of the hollow mold space of the closed baking mold.

When the baking mold and the baking tong are closed, the two tong halves and the two mold halves lie oppositely to each other. The tong halves are supported against each other by means of assigned mutually opposite stops. The baking surfaces arranged on the frontal side of the baking molds are facing each other and are opposite to each other at a predetermined distance. These two substantially horizontally arranged baking surfaces define between them the hollow mold space of the closed baking mold, which depending on the product to be made in the baking mold into a thin-walled shaped body, is laterally open, or laterally limited all around by sealing strips, but not closed up to be gastight. In this hollow mold space a measured amount of the shapeless mass is baked under pressure into a thin-walled shaped body. The baking gases formed during baking in the hollow mold space cause rising of the shapeless mass, distribute it throughout the hollow mold space and flow out laterally from the hollow mold space of the closed baking mold, between the two baking surfaces, into the baking space of the respective baking oven. When the baking mold and the baking tong are closed, the baking gases create an inner pressure in the hollow mold space of the baking mold, which is transmitted via the baking surfaces to the mold halves and from these to the tong halves of the baking tong. This inner pressure is counteracted by the closed baking tongs, which during their revolution, depending on the baking tong and the baking mold, are kept closed either by the inherent weight of their tong halves, or by stationary closing means acting from the outside, or due to baking tong locks laterally mounted on their tong halves, thereby preventing their tong halves lying against each other with their stops from being moved apart by the baking gases.

The inner pressure produced by the baking gases increases in the initial phase of the baking process due to the very intense gas development and decreases with the progressing escape of the baking gases from the hollow mold space. The thereby occurring pressure maximum of the inner pressure depends mainly on the design of the lateral limitation of the hollow mold space, and is therefore considerably lower in a hollow mold space which is completely open laterally than in a hollow mold space which is bordered all around by sealing strips and wherefrom the gases can leave only through a few steam slots of the sealing strips.

In the case of a baking tong whose articulately joined tong halves contain a baking mold which in the closed state defines a laterally open hollow mold space, wherein the inner pressure increases only slightly during baking, the baking mold is kept closed by the inherent weight of the respective tong half lying over the hollow mold space, or by means of a stationary closing mechanism, which prevents the tong halves of a baking tong passing by from being moved apart.

Baking tongs whose tong halves contain the mold halves of baking molds which in the closed state define a hollow mold space which is laterally limited all around by sealing strips, wherein the inner pressure increases strongly during baking, are kept closed laterally on two opposite sides of the respective baking tong. In the case of tong halves linked by an articulation, on the side of the baking tong opposite to the articulation a baking tong lock is provided, which is securely locked when the baking tong is closed. In baking tongs without articulations, whose tong halves are rectilinearly moved towards and away from each other for opening and closing the baking mold, on each of two opposite sides of the baking tong a baking tong lock is provided, which is securely locked when the baking tong is closed. Each baking tong lock is a mechanism built into the respective baking tong, which is externally actuated when the baking tong is closed, which in the locked state rigidly connects the two tong halves. Each baking tong lock has to be actuated after the closing of the baking tong and prior to the opening of the baking tong.

In the known baking ovens, in the baking tongs, respectively in their baking tong halves, flat baking plates are integrated, which are formed on the frontal side as upper, respectively lower mold halves of the baking molds and are heated on their rear side.

From the point of view of construction, layout and function, from the loading station via the individual baking molds and the revolving baking tongs containing the same, to the stationary control mechanisms causing the motions of the individual parts of the revolving baking tongs and to the discharge station for the thin-walled shaped bodies, the known longitudinally extending baking ovens with their continuously revolving baking tong chains are specifically set up for the exclusive production of thin-walled shaped bodies having a single predetermined configuration from shapeless masses prepared according to a certain recipe.

Such baking ovens are used for the industrial production of edible wafers, which are baked in the revolving baking molds of the baking tongs from fluid wafer doughs, which consist primarily of wheat flour and water. Depending on the baking oven and the wafer dough, the consistency of the produced wafers can be crisp, crunchy and brittle wafers, with a moisture content of maximum 1%–4%, or they can have the consistency of soft, elastic wafers with a moisture content of 8% or more.

Such baking ovens are also used for the industrial production of flat decomposable packaging trays, which are baked in the revolving baking molds of the baking tongs from pourable starch-based shapeless masses and which have an elastic consistency with a moisture content of 6% to 22%.

The known longitudinally extending baking ovens with their endless baking tong chains comprising 18 to 140 baking tongs are mechanically very cumbersome machines. The baking molds are received in the baking tongs composed of several components and run through the baking space on lateral running wheels in lateral guide rails on both transport levels of the baking oven. In the antechamber along the guide path of the baking tongs, control cams and mechanisms are provided, which in the passing baking tongs produce the motions of the tong halves for the opening and closing of the baking molds and the motions of the locking elements of the baking tong locks for locking and unlocking of the closed baking tong. Mechanically cumbersome is also the endless baking tong chain, for which a pneumatic or hydraulic chain-tensioning device mounted on the oven frame is required, and which in addition to the baking tongs also consists of two lateral transport chains, which interconnect the baking tongs and run over chain guides arranged at both ends of the baking oven.

In the known longitudinally extending baking ovens for the production of thin-walled shaped bodies the difference in the production capacity of thin-walled shaped bodies determined by the number of its baking tongs, respectively baking molds, shows up only in the differences in the length of the baking ovens, respectively their baking spaces. When an existing longitudinally extending wafer baking oven has to be replaced by a new longitudinally extending baking oven with a higher capacity, then at the site of the baking oven a longer construction space is required for the new baking oven. Under limited space conditions, the length available at the site becomes very quickly a limiting factor for any further capacity increase of the longitudinally extending baking oven and the production installations connected thereto for the further treatment and processing of the thin-walled shaped bodies up to the packaging machine for the end product produced from the thin-walled shaped bodies, which is provided at the end of the respective production installation.

From German Patent 714 019 a wafer baking machine is known wherein guided in the side walls of the machine by lateral running rollers, wafer-molding boxes are provided, which at their top and bottom sides have depressions corresponding to the pattern of the upper, respectively lower side of the wafer to be produced, each carrying lateral hook catches projecting downwards beyond the lower side and thereto assigned locking pins close to their upper side. In a lower transport level, these molding boxes are filled with a baking mass at their upper side and continuously assembled into baking molds at the lower end of a molding box stack supported on stationary catches and extending through a vertical baking shaft upwards to an upper removal station for the baked wafers, each of them consisting of two superimposed molding boxes, rigidly connected by means of the hook catches of the upper box fastened to the locking pins of the lower box. At the lower end of the baking shaft each time a molding box filled with baking mass at its upper side is pressed from below into the baking shaft by means of a crank of a connecting rod gear and joined together with the lowest molding box of the molding box stack to form a baking mold. Thereby the entire molding box stack is lifted by the stationary catches, and lifted by one molding box height, whereby the hook catches of the lowermost molding box in the stack lock into the locking pins of the newly arrived molding box, and then the entire stack with its newest lowermost molding box is again deposited on the stationary catches. With each addition of a molding box at the lower end of the stack, the baking molds in the stack travel stepwise upwards through the baking shaft, while wafer are baked in the baking molds formed by them. When the stack is lifted, in the uppermost baking mold of the stack the hook catches of the upper molding box are swung away from the locking pins of the underlying molding box and the uppermost molding box is coupled to the two endless link chains of an endless conveyor running in the side walls of the machine frame, which lifts this molding box by releasing the uppermost baking mold from the molding box stack and transports it through an upper transport level and a rear vertical transport stretch into the lower transport level, back to the lower end of the baking shaft, where this molding box is again uncoupled from the link chain of the endless conveyor. When the uppermost molding box is lifted from the stack, the baked wafer is left lying on the upper side of the underlying molding box and is removed from this molding box in the upper removal station by means of a stripper. This wafer baking machine has a short baking shaft with a low molding box stack, which consists of a few, relatively thin-walled molding boxes, which are rigidly interconnected by means of hook catches and locking pins, in order to be able to withstand the high inner pressures occurring during the baking of the wafers in the baking molds formed by the molding boxes.

From German Patent 714 019 a wafer baking machine is known, which transports closed baking molds along a vertical transport path through a vertical baking shaft, wherein the baking molds consist of baking mold upper parts with lateral running rollers by means of which they are guided in the lateral walls of the machine frame and which have downwards projecting hook catches at their bottom side, and of baking mold lower parts which can be positioned on the baking mold upper parts and have locking pins provided for the hook catches. At the upper end of the baking shaft the baking mold upper parts are coupled to the two endless link chains of an endless chain conveyor revolving in the lateral walls of the machine frame, which transports the baking mold upper parts and the baking mold lower parts positioned on top of the baking mold upper parts through a transport level and through the rear vertical transport path into a lower transport level, and through the latter to the lower end of the baking shaft, where the baking mold upper parts bearing the baking mold lower parts are again uncoupled from the link chains of the endless conveyor. At the lower end of the baking shaft, in a continuous process, each lower baking mold part which is loaded with the baking mass while passing through the lower transport level is joined with the preceding upper baking mold part to form a baking mold and the baking mold upper part is rigidly connected to the lower part by tightening of its hook catches to the locking pins of the lower baking mold part. By means of a vertical connecting rod gear, the closed and locked baking molds formed this way are moved upwards stepwise through the baking shaft, through the superimposed and distanced stacking levels of the baking shaft defined by fixed ratchets, from one stacking level to the next, while the wafers are baked in them. At the upper end of the baking shaft, by releasing the hook catches from the locking pins, the baking molds are again disassembled into in upper baking mold parts and lower baking mold parts. Thereby the upper baking mold part of the uppermost baking mold arranged in the stacking level before last is coupled to the endless link chain of the endless conveyor, which lifts the upper baking mold part from its underlying lower baking mold part and entrains upwards the lower baking mold part carrying a baked wafer arranged above it in the last stacking level, towards the upper discharge station, where the wafer is removed from this lower baking mold part. The lower baking mold part carrying a baked wafer remaining on the stacking level before last, is lifted at the next lifting motion of the stack to the last stacking level by means of the connecting rod gear.

OBJECT OF THE INVENTION

It is the object of the invention to provide a compact baking oven for the production of thin-walled shaped bodies in baking molds, each consisting of two mold halves which can be opened and closed.

SUMMARY OF THE INVENTION

As a solution to this problem the invention proposes a baking oven for the production of thin-walled shaped bodies in baking molds each consisting of two mold halves which can be opened and closed, which define with their mold halves the outer configuration of the shaped bodies produced therein. In this baking oven the baking mold halves are formed by baking sheets stacked on top of each other at least in pairs, which are transported in the baking oven in a closed cycle which comprises a vertical transport path arranged in succession of a lower loading station and leading through a vertical baking shaft to an upper removal station, at whose lower end the baking sheets forming the lower mold halves loaded with the pre-product in the lower loading station are integrated together with the baking sheet forming the upper mold halves into a vertical stack consisting of at least two superimposed baking sheets, which extends along the vertical transport path through the baking shaft and at the top end of the transport path is decomposed into separate baking sheets, while the baking molds formed by the pairwise superimposed baking sheets move stepwise upwards in the stack and through the baking shaft, and the pre-products contained in the baking molds are baked into thin-walled shaped bodies, which, when the stack is separated, are removed from he separate baking sheets in the upper removal station. According to the invention this baking oven is characterized in that the closed cycle to be traveled by the baking sheets has a second vertical transport path arranged downstream of an upper loading station leading through a vertical baking shaft to a lower removal station, at whose upper end the baking sheets forming the lower baking mold half loaded with the pre-product in the upper loading station, together with the baking sheets forming the upper mold halves are integrated in a second vertical stack consisting of at least pairwise superimposed baking sheets rigidly interconnected by locking means, this stack extending along the second transport path through the baking shaft and at the lower end of the second vertical transport path is separated into individual baking sheets after the locking devices are released, while the baking molds formed by the pairwise superimposed baking sheets, rigidly interconnected by locking means, travel stepwise downwards through the baking shaft and the pre-products contained in the baking molds are baked into thin-walled shaped bodies, which at the separation of the second stack are removed from the individual baking sheets in the lower removal station.

This construction makes possible a clear increase of the production capability of the baking oven, which is largely independent of the size of the required site for the respective baking oven tower, since each increase of the production capability leads only to a height increase of the baking oven tower. This is of particular advantage under limited space conditions.

According to a further feature of the invention, in the second vertical transport path above the baking shaft, a locking station assigned to the upper loading station can be provided for locking the baking molds formed by the pairwise superimposed baking sheets which have been newly loaded with pre-product.

According to a further feature of the invention, above the baking shaft a transfer device assigned to both upper ends of the two transport paths can be provided, for the locked baking molds formed by the pairwise superimposed baking sheets.

According to a further feature of the invention, each vertical transport path can have its own baking shaft.

According to a further feature of the invention, at the bottom end of the first vertical transport path a first stacking device forming the first stack can be provided and at the bottom end of the second transport path a second stacking device for the separation of the second stack can be provided.

According to a further feature of the invention, it can be provided that the respective stacking devices arranged at the bottom ends of the two vertical transport paths be designed as the vertical conveyor assigned to the respective transport path.

According to a further feature of the invention, it can be provided that at the upper end of the first transport path, a separating device assigned to the first stack for dismantling the first stack be arranged above the baking shaft.

According to a further feature of the invention, the baking sheets can be provided with mutually facing upper, respectively lower stacking surfaces, by means of which they lie on top of each other within the stack.

According to a further feature of the invention, it can be provided that on the top side of the baking sheets several baking mold parts designed as lower baking mold halves be arranged next to each other.

According to a further feature of the invention, it can be provided that the upper stacking surfaces of the baking sheets assigned to the top sides be integrated in the sealing strips of the baking mold halves arranged on the top sides of the baking sheets, and that the lower stacking surfaces assigned to the bottom sides of the baking sheets be integrated into the sealing strips of the upper baking mold halves arranged on the bottom sides of the baking sheets, whereby the baking sheets lie on top of each other with the sealing strips of their baking mold halves within the respective stack.

According to a further feature of the invention, it can be provided that for the purpose of rigidly connecting the superimposed baking sheets, each baking sheet be provided with lateral engagement surfaces for locking devices which are outwardly attached to two superimposed baking sheets.

According to a further feature of the invention, it can be provided that each baking sheet be built as the upper, respectively lower baking sheet carrying the upper, respectively lower baking mold halves, which on their frontal side and their rear side have mutually facing stacking surfaces, by means of which they lie on top of each other in the integrated state, and that for rigidly connecting the baking sheets pairwise stacked on each other with their frontal sides, locking devices are provided which rigidly connect both baking sheets.

According to a further feature of the invention, it can be provided that in the upper and lower baking sheets the stacking surfaces respectively assigned to their frontal sides are each integrated in the sealing strips of their mold halves and the baking sheets superimposed in pairs lie on top of each other with the sealing strips of their mold halves.

According to a further feature of the invention, it can be provided that the upper and lower baking sheets be provided with lateral engagement surfaces for the locking devices to be attached from the outside.

According to a further feature of the invention, it can be provided that the upper and lower mold halves be formed by baking sheet units usable on both sides and heated from within, which form the lower mold halves with their top sides and the upper mold halves with their bottom sides, and lie on top of each other in both stacks without leaving any gaps.

According to a further feature of the invention, it can be provided that baking sheet units usable on both sides lie only loosely on top of each other in the first stack in the upwards leading first transport path, and that in the second stack arranged in downwards leading vertical transport path are rigidly interconnected in pairs by locking devices, whereby within the first stack each separate backing mold formed by superimposed baking sheet units is kept closed against the inner pressure generated during baking by the weight of the respective part of the first stack resting thereon, while it travels stepwise upwards through the vertical baking shaft to the upper removal station.

The construction of the invention makes possible a clear reduction of the number of constantly moving parts of the baking oven by replacing the transport device extending along the baking shaft or through the same, with the constantly replenished or baking mold stack which is continuously formed or separated outside the baking shaft. The continuously replenished baking mold stack therefore requires also less maintenance than a transport device extending along or throughout the baking shaft or than an endless transport device travelling through the entire baking oven with all its moving parts and the respectively required guide elements of their endless transport chains and the like.

In the construction according to the invention all moving parts of the devices performing the transport of the closed baking molds through the respective baking shaft are arranged outside the baking shaft and thereby they are exposed neither to the atmosphere of the baking shaft with its high percentage of steam, nor to the high temperatures of the baking shaft ranging between 170 to 240 degrees Celsius. The stackable baking sheet units which can be used on both sides with the baking mold halves arranged on their top side, respectively bottom side, allow for a twisting and bending resistant construction of the sheet body which supports the back of the baking surfaces, whereby the heating channels built into the sheet body further reinforce the sheet body. The mutually facing stacking surfaces allow for a precise mutual placement of the two mold halves of a baking mold which is formed between two superimposed baking sheet units during the closing of the baking mold, respectively when the two baking sheet units are placed one on top of the other.

The stackable baking sheet units can be made in one piece, whereby the baking surfaces and the stacking surfaces arranged on their top and bottom sides can be integrated in the respective sheet body.

The stackable baking sheet units can each consist of a top part formed by the upper baking sheet and a bottom part formed by the lower baking sheet. The upper baking sheets, together with the lower baking mold halves formed on their frontal sides, form the top sides of the baking sheet units, and together with the reinforcement ribs formed on their back side, they form the upper part of the bordering walls of the heating channels of the baking sheet units. The lower baking sheets, together with the upper baking mold halves formed on their frontal sides, form the bottom sides of the baking sheet units, and together with the reinforcement ribs formed on their back sides form the lower part of the border walls of the heating channels of the baking sheet unit. At their back sides, these upper and lower baking sheets lie on top of each other with the frontal sides of their reinforcement ribs and are rigidly connected with each other in pairs to the respective baking sheet unit.

These two-sided usable, stackable baking sheet units, which can be made in one piece, or of a parallelepipedic plate body with baking sheets attached to its top and bottom sides, or of two baking sheets resting against each other with their back sides, are stacked on top of each other for forming baking molds and thereby pushed against each other from below, with their mutually assigned stacking surfaces. Thereby an upper mold half formed on the bottom side of the upper baking sheet unit is put together with a lower mold half formed on the top side of the lower baking sheet unit to form a baking mold and this baking mold is being closed at the same time. The closed baking mold limited at the top and the bottom by two superimposed baking sheet units can contain a single hollow space for the production of thin-walled shaped bodies. This baking mold can also contain several hollow mold spaces of equal size for the simultaneous production of several thin-walled shaped bodies in a single baking mold. This baking mold can also contain several hollow mold spaces of various configuration for the simultaneous production of several different thin-walled shaped bodies in a single baking mold.

These two-sided usable, stackable baking sheet units can be provided with locking devices assigned to the baking molds formed by them, for the rigid connection of two superimposed baking sheet units, the upper parts of these locking devices being attached to the upper baking sheet unit and their lower parts to the lower baking sheet unit, and which comprise locking members which have to be set on the upper part and the lower part of the respective locking device for rigidly connecting the two baking sheet units, and for the release of the respective locking device have to be removed from the upper part and the lower part of the respective locking device. Each single baking sheet unit carries the lower parts of the locking devices which are assigned to the downwards limited baking mold, and the upper parts of those locking devices which are assigned to upwards limited baking mold.

The two-sided usable, stackable baking sheet units can be provided, for the purpose of rigidly connecting two baking sheet units stacked on top of each other, with the locking devices of the baking molds enclosed by them, which consist of mutually engaging upper parts and lower parts, whereby each individual baking sheet unit carries the lower parts of that locking devices which are assigned to the baking molding downwards limited by the sheet, and the upper parts of those locking devices which are assigned to the baking molds limited upwards by the sheet.

For the rigid connection of two baking sheets unit stacked on top of each other, the same can be equipped with the self-locking clamping device known from WO 96/14750 for pressing the baking mold parts of the closed baking mold against each other. When clamped, these clamping devices press both baking sheet units enclosing the baking mold between them against each other, with a predetermined prestress force and maintain this prestress force due to self-locking friction engagement of the respective clamping elements, until the clamping device is forcibly opened.

A self-locking clamping device can comprise a pivotably supported clamping lever, with its clamping segment facing its pivot axis and a clamping surface arranged on the other baking sheet unit. In order to tighten the clamping device, the clamping lever with its clamping segment is brought into force-locking and self-locking frictional engagement with the clamping surface, and moved along the clamping surface in this frictional engagement, until the motion play of the clamping lever is eliminated and the desired prestress force is applied through the elastic expansion of the lever on both opposite sides of the baking sheet units.

A self-locking clamping device can comprise a clamping element designed as a basically C-shaped bracket provided at its ends with mutually facing clamping segments and two thereto assigned clamping surfaces facing away from each other on both baking sheet units. For tightening the clamping device, the bracket with its two clamping segments is pushed from the outside over the assigned clamping surfaces, brought into a self-locking non-positive frictional engagement with the same and moved along in this frictional engagement on both clamping surfaces, until the motion play of the bracket required by the applying motion is eliminated, and the desired prestress force due to the elastic expansion of the bracket is applied to both baking sheet units stacked on top of each other.

Two baking sheets stacked on top of each other can be rigidly connected to each other at two opposite frontal sides by means of two self-locking clamping devices arranged at a distance from each other along the respective frontal side, each of them having on one baking sheet unit a clamping lever pivotable about a horizontal pivot axis and a thereto assigned clamping surface on the other baking sheet unit, along which the clamping lever of the respective clamping device can be swung with its clamping segment in a non-positive self-locking frictional engagement, until the motion play of the clamping lever is eliminated and the desired prestress force has been applied on both superimposed baking sheet units, due to the elastic expansion of the respective clamping lever.

The two-sided usable, stackable baking sheet units are transported in a closed cycle through the respective baking oven, and pass through the respective vertical transport path of the baking oven in a vertical stack consisting of stacked baking sheet units lying on each other and which is continuously replenished by a baking sheet unit at one end and reduced by one baking sheet unit at the other end. The two-sided usable, stackable baking sheet units make it possible to combine the formation process of the respective stack with the closing process of the baking molds, and the dismantling process of the respective stack with the opening process of the baking molds, so that for the closing of the balking molds after they have been loaded with pre-product and for the opening of the baking molds prior to the removal of the baked shaped body no additional mechanisms or actuating devices are required for the baking sheet units. The stacking device of the baking oven producing the respective stack stacks the baking sheet units from above, respectively from below, thereby closing the baking molds at the same time. The separating devices of the baking oven dismantling the respective stack removes the baking sheet unit upwards, respectively downwards and thereby opens the baking molds, respectively decomposes the same into their baking halves, at the same time.

In the baking ovens of the invention, wherein two-sided usable, stackable baking sheet units, during their integration into the stack and the therewith connected closing of the baking molds, are rigidly connected to the baking sheet units already integrated in the stack by means of locking devices or self-locking clamping devices, the locking devices respectively the self-locking clamping devices can be automated, so that they automatically establish a rigid connection between the two baking sheet units during the stacking process, and only before the baking sheet units are separated have to be actively released by an actuating device. This actuating device can be integrated in the individual separating device, which when seizing the last baking sheet unit of the respective stack, releases the locking device, respectively the self-locking clamping device, before it removes upwards, respectively downwards, the last baking sheet unit from the stack. In the case of externally actuatable locking device, the device for the locking of the locking device can be integrated in the stacking device producing the stack. In the case of externally actuatable self-locking clamping devices, the actuating device which tightens the respective self-locking clamping device until the desired prestress force is applied to both neighboring baking sheet units, can be integrated in the stacking device forming the stack.

In a stack consisting of two-sided usable, stackable baking sheet units, which is continuously replenished at its bottom end and then again continuously dismantled at its top end, the baking sheet units are stacked on top of each other from below at the bottom end, and at its top end they are separated upwards. In the loading station assigned to the bottom end of the stack, a new baking sheet unit is loaded with pre-product on its upper side, before it is integrated during the following stacking process into a stack resting with its entire weight on the lowermost baking sheet unit. The new baking sheet unit is transported underneath the stack and pressed from below against the lowermost baking sheet unit of the stack, until it bears the entire stack weight as the new lowermost baking sheet unit of the stack. During this stacking process the stack is replenished at its bottom end with a new baking sheet unit, and at the same time the upper mold half formed on the bottom side of its lowermost baking sheet unit forms a new closed baking mold with the lower baking mold half loaded with the pre-product, formed on the top side of the new baking sheet unit. This baking mold is now the lowermost baking mold in the baking mold stack formed by the baking sheet units stacked on top of each other. The hollow mold space of this baking mold is kept closed against the inner pressures developing during baking by the entire weight of the stack. This baking mold travels together with the baking sheet units delimiting its hollow mold space by one level upwards with each new stacking process, and at each level it is kept closed by the weight of the stack portion existing above this level. At the top end of the stack, the hollow mold space is kept closed only by the weight of the upwards limiting baking sheet unit, and when this baking sheet unit is lifted during the dismantling of the stack, it is also opened. The thin-walled shaped body produced in this hollow mold space is left on the lower mold half formed on the top side of the uppermost baking sheet unit and can be directly removed from the same.

In a stack consisting of stackable, two-sided usable baking sheet units which can be rigidly connected in pairs by locking devices, respectively self-locking clamping devices and is continuously replenished at its top end and again continuously dismantled at its bottom end, the baking sheets are stacked from above on top of each other at the top end of the stack and at the bottom end they are individually separated downwards. In the loading station assigned to the upper end of the stack, the upper side of the stack is loaded with the pre-product, before a new baking sheet unit is placed on the stack and rigidly connected with the uppermost baking sheet unit of the stack by locking the locking device, respectively tightening the self-locking clamping device. In this stacking process the stack is completed at its top end by a baking sheet unit. At the same time the lower baking mold half loaded with pre-product on the top side of the uppermost baking sheet unit of the stack is joined with the upper baking mold half on the bottom side of the new baking sheet unit to form a new closed baking mold and the baking mold halves of this baking mold are rigidly connected to each other by locking devices, respectively self-locking clamping devices. This newly formed baking mold is the uppermost baking mold in the baking mold stack formed by the baking sheet units stacked on top of each other, and is kept closed against the inner pressure generated inside it during baking by the locked locking devices, respectively tightened self-locking clamping devices. This baking mold travels with the two baking sheet units delimiting it through the stack by one level downwards with each further stacking process. When it reaches the bottom end of the stack, this baking mold becomes the lowermost baking mold of the stack and the baking sheet unit delimiting downwards becomes the lowermost baking sheet unit of the stack, which is engaged with a lateral holding device and bears the weight of the entire stack. At the bottom end of the stack this baking mold is kept closed by the weight of the entire stack and with the separation of the lowermost baking sheet unit it is also opened with the dismantling of the stack. The locked locking devices, respectively the tightened self-locking clamping devices assigned to this baking mold are released the latest before the separation of the lowermost baking sheet unit of the stack. In order to dismantle the stack, the entire stack is lifted, the lateral holding device is removed from the baking sheet unit which delimits downwards the lowermost baking mold, the stack is lowered by one level, the lateral holding device engages the baking sheet unit delimiting upwards the lowermost baking mold in the stack and the stack is deposited on the lateral holding device. The lowermost baking sheet unit of the stack separated this way, is lowered downwards from the bottom end of the stack, together with the thin-walled shaped body left thereon, and thereby at the same time the baking mold downwards limited by the same is opened. The thin-walled shaped body produced in this baking mold is left lying on the upper side of the lowered baking sheet unit and can be directly removed from the same.

In a stack consisting of stackable, two-sided usable baking sheet units rigidly connected in pairs by locking devices, respectively self-locking clamping devices and which is constantly replenished at its lower end and constantly dismantled again at its upper end, the baking sheet units can be stacked from below on top of each other at the bottom end of the stack, without connecting the superimposed baking sheet units to each other by means of locking devices, respectively self-locking clamping devices.

For the rigid connection of two baking sheets stacked with their frontal sides on top of each other pertaining to each baking mold, it is possible to provide the self-locking clamping devices known from WO 96/14750 for pressing baking mold parts of the closed baking mold against each other. These clamping devices press the two superimposed baking sheet against each other with a predetermined prestress force and maintain the prestress force through the self-locking frictional engagement of their respective clamping elements up to the point when the clamping device is released.

A self-locking clamping device can comprise a pivotably supported clamping lever, with its clamping segment facing its pivot axis and a clamping surface arranged on the other baking sheet unit. In order to tighten the clamping device, the clamping lever with its clamping segment is brought into force-locking and self-locking frictional engagement with the clamping surface, and moved along the clamping surface in this frictional engagement, until the motion play of the clamping lever is eliminated and the desired prestress force is applied through the elastic expansion of the lever on both superimposed sides of the baking sheet units.

A self-locking clamping device can comprise a clamping element designed as a basically C-shaped bracket provided at its ends with mutually facing clamping segments and two thereto assigned clamping surfaces facing away from each other on both baking sheet units. For tightening the clamping device, the bracket with its two clamping segments is pushed from the outside over the assigned clamping surfaces, brought into a self-locking non-positive frictional engagement with the same and moved along in this frictional engagement on both clamping surfaces, until the motion play of the bracket required by the applying motion is eliminated, and the desired prestress force due to the elastic expansion of the bracket is applied to both baking sheet units stacked on top of each other.

Two baking sheet stacked on top of each other can be rigidly connected to each other at two opposite frontal sides by means of two self-locking clamping devices arranged at a distance from each other along the respective frontal side, each of them having on one baking sheet unit a clamping lever pivotable about a horizontal pivot axis and a thereto assigned clamping surface on the other baking sheet unit, along which the clamping lever of the respective clamping device can be swung with its clamping segment in a non-positive self-locking frictional engagement, until the motion play of the clamping lever is eliminated and the desired prestress force has been applied on both superimposed baking sheet units, due to the elastic expansion of the respective clamping lever.

In the baking ovens of the invention, which are equipped with two-sided stackable baking sheets, the openable and closable baking molds formed by these baking sheets are transported in a closed cycle through the respective baking oven. These baking molds consist respectively of an upper and lower baking sheet and of the locking devices, respectively self-locking clamping devices rigidly connecting the two baking sheets and attached on this two baking sheets, or externally applied to the two baking sheets.

In the case of each individual baking mold, after its lower baking sheet has been loaded with pre-product, the upper baking sheet is positioned on top of its lower baking sheet, and both baking sheets are rigidly connected to each other by means of the respective locking device, respectively self-locking clamping device to form a rigid body. This rigid body is transported as a baking mold unit through the vertical baking shaft of the baking oven, and after passing through the vertical baking shaft, is again separated into the two stackable baking sheets, in order to make possible the removal of the baked shaped body from the lower baking sheet of the opened baking mold.

In a vertical baking shaft which is traversed by a vertical transport path for the closed baking molds, containing a stack continuously replenished at one end and continuously dismantled at the other end, the closed baking molds formed as rigid bodies are integrated into this stack at one end of the stack by the stacking device of the baking oven producing the stack, and at the other end of the stack, they are removed from the stack by the releasing separating device of the baking oven.

Within the stack the baking mold units lie loosely on top of each other, only due to their own weight, with their stacking surfaces arranged on the rear side of their baking sheets, therefore on their upper, respectively lower sides. The vertical stack consists on the one hand of the baking mold units lying loosely on top of each other, alternately with their underside respectively upper side, and on the other hand of the stackable baking sheets arranged on top of each other in the stack, lying on top of each other in pairs with the stacking surfaces of their frontal, respectively rear sides. Within the stack the stackable baking sheets are rigidly interconnected at their superimposed frontal sides, inside each closed baking mold, and lie loosely on top of each other in pairs, with their rear sides.

The baking mold units designed as a rigid body travel within the stack in steps from the stacking device to the separating device, thereby traversing the vertical baking shaft, while inside the pre-products are baked into shaped bodies, and they themselves act against the inner pressure generated during the baking process with their locking devices, respectively self-locking clamping devices rigidly connecting their two baking sheets.

The baking molds can be provided with locking devices, respectively self-locking clamping devices, which automatically rigidly connect the two baking sheets during the closing of the baking mold, being externally activated by actuation devices of the baking oven, and which when the closed baking mold unit is opened, can be actively released by the therefor provided actuation devices of the baking oven, prior to moving the two baking sheets away from each other.

The baking molds can be provided with locking devices, respectively self-locking clamping devices, which, when externally activated by the therefor provided actuation devices of the baking oven, rigidly connect the two baking sheets during the closing of the baking mold, and which when the closed baking mold unit is opened, can be actively released by the therefor provided actuation devices of the baking oven, before the two baking sheets are moved away from each other.

Subsequently the invention is closer described with reference to several embodiment examples represented in the drawing.

SPECIFIC DESCRIPTION

Figure 1:
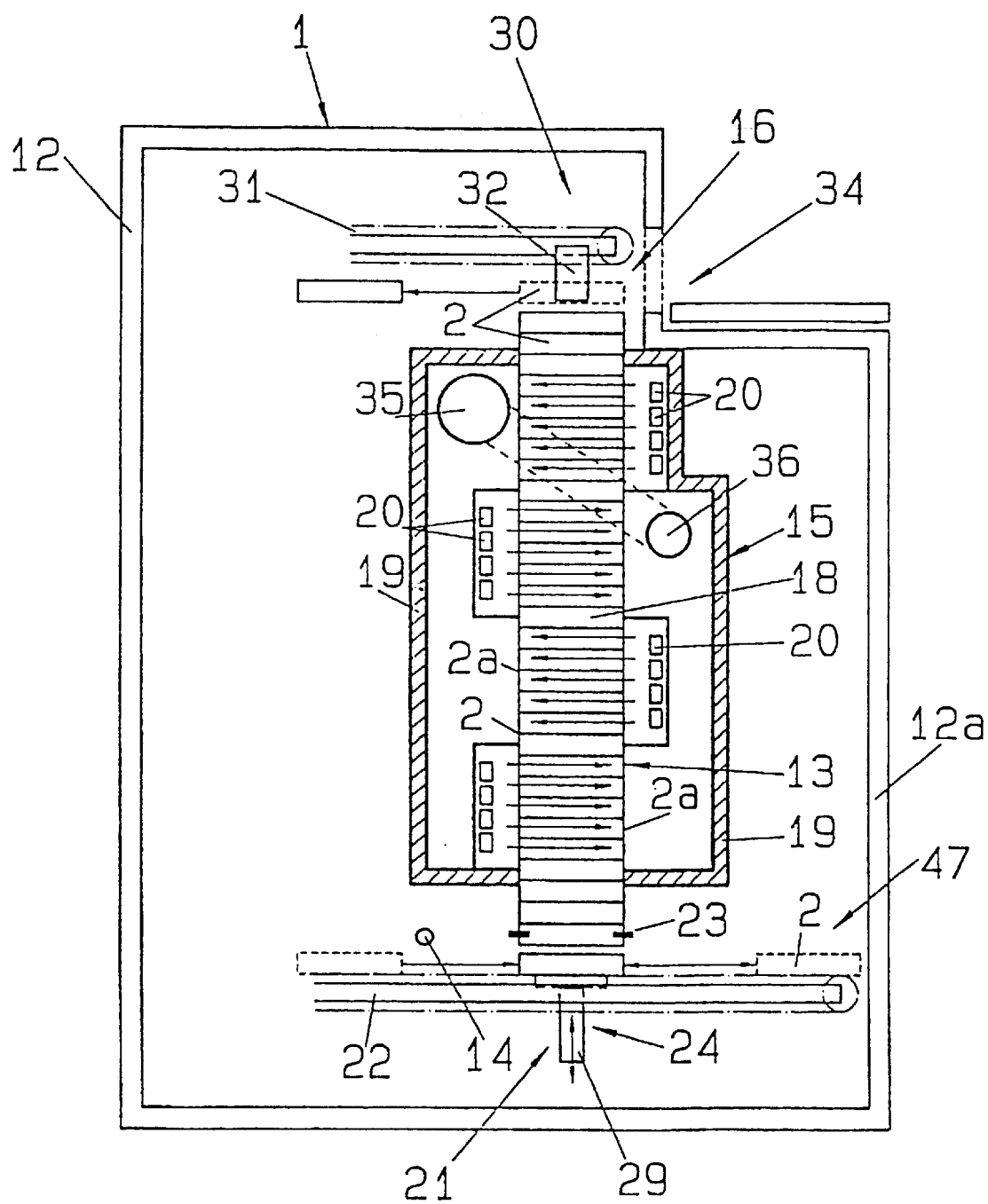
FIG. 1 schematically in section a baking oven with a frontal vertical transport path for the production of thin-walled shaped bodies, FIG. 2 schematically a baking oven with two vertical transport paths running in opposite directions for the production of thin-walled shaped bodies, FIG. 3 schematically a section of the transport path traversing the vertical baking shaft for the production of thin-walled shaped bodies, FIG. 4 a part of a stackable baking sheet unit for the production of thin-walled shaped bodies in cross section, FIG. 5 the part of the stackable baking sheet unit of FIG. 4 in a longitudinal section, FIG. 6 a top view on the part of the stackable baking sheet unit of FIG. 4, FIG. 6a a section of a sealing strip of the stackable baking sheet units of FIG. 4, in a side view as shown by arrow A, FIG. 7 a section of a vertical stack formed by baking sheet units stacked on top of each other, wherein the baking sheet units within the stack lie loosely on top of each other and are kept together only by the weight, FIG. 8 a section of a vertical stack formed by baking sheet units stacked on top of each other, wherein the baking sheet units are rigidly connected in pairs within the stack, by means of locking devices mounted on the baking sheet units.

FIG. 1 shows a gas-heated baking oven 1 for the production of thin-walled shaped bodies, which for instance are built as flat rectangular sheets which at their upper and lower sides have wafer patterns formed by raised ribs. These thin-walled shaped bodies are made of a shapeless mass in baking molds which can open and close, each consisting of two mold halves which determine the outer configuration and the wall thickness of the thin-walled shaped body.

For the formation of the baking molds which can open and close, stackable baking sheet units 2 (FIGS. 4–6a) which can be used on both sides are provided, whose parallelepipedic plate bodies can be heated through heating channels 3 and are provided on two opposite edges sides 2a with lateral holding openings 4, and which on the top sides 2b and the bottom sides 2c form baking surfaces 5, 6 and the thereto assigned stacking surfaces 7, 8. The top sides 2b of the baking sheet units 2 are designed as lower mold halves of the baking molds, and the bottom sides 2c of the baking sheet units 2 are designed as upper mold halves of the baking molds. Two superimposed baking sheet units 2 lie with their mutually facing stacking surfaces 7, 8 on top of each other and form together a closed baking mold for the respective thin-walled shaped body to be produced. This baking mold consists of the upper baking mold half arranged on the bottom side 2c of the baking sheet unit 2 and of the lower mold half arranged on the top side 2b of the lower baking sheet unit 2. The stackable baking sheet units 2 which can be used on both sides with the respective therein integrated baking mold halves are set for the production of a certain thin-walled shaped body.

Baking sheet units 2 for the production of flat rectangular sheets have basically a rectangularly shaped plate body. On the top side 2b and the bottom side 2c of the plate body a substantially flat, rectangular baking surface 5, 6 defined by lateral sealing strips 9, 10 is formed. The stacking surfaces 7, 8 of the baking sheet units 2 are integrated in these sealing strips 9, 10, each of them protruding beyond the baking surface 5, 6 they define and together with the same form the upper baking mold half 5, 9, respectively the lower baking mold half 6, 10 of the baking sheet unit 2. In the lower baking mold half 5, 9 at least one steam channel 11 traversing at least one sealing strip 9b is formed in two opposite sealing strips 9b. Two baking sheet units 2 stacked on top of each other lie with the sealing strips 9 and 10 of their mutually facing baking mold halves 5, 9, respectively 6, 10 on top of each other and form a closed baking mold, which is completely closed except for the lateral steam channels, through which the gases generated during baking can escape when the baking mold is completely closed.

Baking sheet units for the production of round, triangular, pentagonal or fan-shaped flat layers can basically have a plate body with round, triangular, pentagonal, or fan-shaped baking surfaces on their top and bottom sides, each defined by lateral sealing strips in which the stacking surfaces of the respective baking sheet unit are integrated. However these baking sheet units can also have parallelepipedic plate bodies corresponding in shape to the layer to be produced with a round, triangular, pentagonal or fan-shaped base.

Baking sheet units for the production of thin-walled bodies shaped like rectangular trays slightly opening upwards, have basically a rectangular plate body which on the top side carries an upper baking surface provided with a depression corresponding to the configuration of the tray, and on its bottom side a lower baking surface provided with a raised portion corresponding to the configuration of the tray. Both baking surfaces are bounded by sealing strips which correspond to the contour of the tray and form the stacking surfaces of the baking sheet unit.

Baking sheet units for the production of thin-walled shaped bodies, which are shaped as flat layers with undefined borders have a parallelepipedic plate body on whose top and bottom sides baking surfaces corresponding to the respective contour of the flat layers to be produced are arranged, and outside the same spacers are arranged which determine the wall thickness of the shaped body area provided, wherein the upper, respectively lower stacking surfaces of the baking sheet unit are integrated.

In the baking oven shown in FIG. 1 the two-sided usable, stackable baking sheet units 2 are transported through the baking oven 1 in a closed cycle inside of the outer heat-insulating lining 12 of the baking oven 1. This cycle comprises a vertically upwards leading transport path 13, at the beginning of which the baking sheet units 2 are stacked on top of each other for the formation of baking molds and at whose end for the opening of the baking molds the baking sheet units 2 are again separated. This vertical transport path 13 for the closed baking molds leads from a lower loading station 14 through a vertical baking shaft 15 built as a baking space to an upper removal station 16. From the removal station 16 the separated baking sheet units 2 are transferred to a rear vertically downwards leading transport path, not closer detailed in FIG. 1, and there they are lowered individually, before they are again directed to the frontal vertically upwards leading transport path 13.

The closed baking molds and the baking sheet units 2 forming the same are transported upwards through the frontal vertical transport path 13 by the continuously replenished stack 18, consisting of loosely superimposed baking sheet units kept together only by the weight, through the baking shaft 15.

Inside the baking oven 1, the baking shaft 15 is limited towards the outside by a heat-insulating shell 19. Inside the baking shaft 15 and along the stack 18 gas burners 20 are arranged vertically on top of each other. The heating gases produced by them flow through the heating channels 4 of the baking sheet units 2 throughout the stack 18, this way heating the closed baking molds enclosing the pre-products, which are contained in the stack 18.

At the bottom of the baking shaft 15, the stack 18 is continuously replenished with baking sheet units 2 supplied from a lower horizontal conveyor, by means of a stacking device 21. The stacking device 21 consists of a support device 23 assigned to the bottom end of the stack 18 and of a lifting device 24 arranged underneath the stack. The support device 23 (FIG. 12, 13) is engaged with the lowermost baking sheet unit 2 of the stack 18, on which rests the weight of the entire stack 18. The support device 23 comprises two carriages 25, 26 which are located opposite from each other in a horizontal plane. These carriages 25, 26 are vertically supported in the frame of the baking oven 1 and are provided at mutually facing frontal sides with holding bolts 27, 28, which reach into the lateral holding openings 4 of the lowermost baking sheet unit 2 of the stack 18 and carry the entire weight of the stack 18. During a stacking process the two carriages 25, 26 are at first pulled apart for releasing the stack 18 and thereby are pulled out with their holding bolts 27, 28 from the lowermost baking sheet unit 2 of the stack 18, and then for fastening the stack 18, they are again pushed together and thereby pushed back with their holding bolts 27, 28 into the holding openings 4 of the newest lowermost baking sheet unit 2 of the stack.

The baking sheet units 2 to be stacked are transported by the horizontal conveyor 22 through the loading station 14, which precedes the vertical transport path 13 and the bottom end of the stack 18. This loading station 14 can for instance be built like a pouring station, wherein each time a measured amount of a pre-product prepared as a shapeless mass is poured onto the top side 2b of the respective baking sheet unit 2. The baking sheet units 2 loaded with the pre-product on the top side 2b is transported by the lower horizontal conveyor 22 under the stack 18 and there it is lifted from the lower horizontal conveyor 22 by a vertically displaceable ram 29 of the lifting device 24. This ram 29 presses the new baking sheet unit 2 to be integrated in the stack 18 from below against the lowermost baking sheet unit 2 of the stack 18, takes over its entire weight and thereby integrates this baking sheet unit 2 as the new lowermost baking sheet unit 2 in the stack 18. After the heretofore lowermost baking sheet unit 2 of the stack 18 is released by the support device 23, the ram 29 of the lifting device 24 lifts the entire stack 18 by the height of one baking sheet unit 2. Subsequently the support device 23 is brought into engagement with the new lowermost baking sheet unit 2 of the stack 18 and the stack 18 is deposited by the lifting device 24 onto the support device 23.

At the top of the baking shaft 15, the stack 18 is continuously separated into individual baking sheet units 2 by a separating device 30, which comprises a gripper head 32 carried by an upper horizonal conveyor 31, which seizes the uppermost baking sheet unit 2 of the stack 18 electromagnetically or mechanically, lifting it from the stack 18 and transferring it to the unillustrated vertical conveyor of the vertically downward leading transport path. When the gripper head 32 lifts the uppermost baking sheet unit 2 from the stack 18, the uppermost baking mold, which up to this moment was upwardly limited by this baking sheet unit 2, opens. The shaped body baked in this baking mold is left on the upper side of the baking sheet unit, which up to this point limited this baking mold downwards. The former is now the uppermost baking sheet unit 2 of the stack 18, whose top side forms the top side of the stack 18.

The shaped bodies baked in the stack 18 are each removed in the removal station 16 by means for instance of a suction head (not shown) and guided to a discharge station 34 in the vicinity of the stack 18, through which they are discharged from the baking oven 1.

In the baking shaft 15 traversed by the stack 18 (FIG. 1), the gas burners 20 can be arranged vertically on top of each other on two opposite sides of the stack 18, alternately staggered with respect to each other. The heating gases flowing from one side of the stack 18 into the heating channels 4 of the baking sheet units 2, after flowing through the baking sheet unit 2, escape on the opposite side of the stack 18 into the baking shaft 15. The heating gases leave the baking shaft 15 together with the heating gases escaping from the closed baking molds of the stack 18 through two upper exit openings 35, 36. The gas burners 20 and the thereto assigned exit openings 35, respectively 36 are arranged on different sides of the stack 18.

According to an alternate embodiment example (FIG. 3) the baking shaft 37 can be subdivided by a horizontal dividing wall 38 in two superimposed shaft sections 39, 40, wherein the gas burners 41, 42 and the thereto assigned exit openings 43, 44 can be arranged on the same side of the stack 18, vertically above each other. Each shaft section 39, 40 contains a lower heating zone 39a, respectively 40a, wherein the gas burners 41, respectively 42 are arranged, and an upper heating zone 39b, respectively 40b, wherein an exit opening 43, respectively 44 of the baking shaft 39, respectively 40 is arranged. The gas burners 41, respectively 42 and the exit opening 43, respectively 44 are each separated from each other by an intermediate floor 45, respectively 46, which has a central opening 45a, respectively 46a for the passage of the stack 18 and a lateral floor opening 45, respectively 46 for the passage of the heating gases and baking gases from the lower heating zone 39a, respectively 40a into the upper heating zone 39b, respectively 40b.

The horizonal conveyor 22 arranged beneath the baking shaft 15 extends beyond the bottom end of the stack 18 to a discharge station 47 for the stackable baking sheet units 2 in the vicinity of the side wall 12a of the baking oven 1, shown on the right in FIG. 1, which has a service door (not shown) provided in the side wall 12a of the baking oven 1.

Via the discharge station 47 for the stackable baking sheet units 2, a baking sheet unit 2 which has been transferred by the vertically downwards leading transport path to the lower horizontal conveyor 22, can be transported by the lower conveyor 22 bypassing the lower end of the stack 18 to the discharge station 47 and from there exit the baking oven 1. After the baking sheet unit 2 has been cleaned and serviced, the same can be reintroduced in the baking oven 1 via the discharge station 47 and transported by the lower horizontal conveyor 22 to the stacking device 21, without having to dismount or dismantle parts of the baking oven 1.

The discharge station 47 for the stackable baking sheet units 2 makes possible the replacement of individual baking sheet units 2 via the discharge station 47 with other baking sheet units 2, this way refitting the baking oven 1 for the production of other thin-walled shaped bodies. So for instance stackable baking sheet units 2 provided for the production of flat layers can be exchanged for stackable baking sheet units provided for shallow trays.

Figure 2:
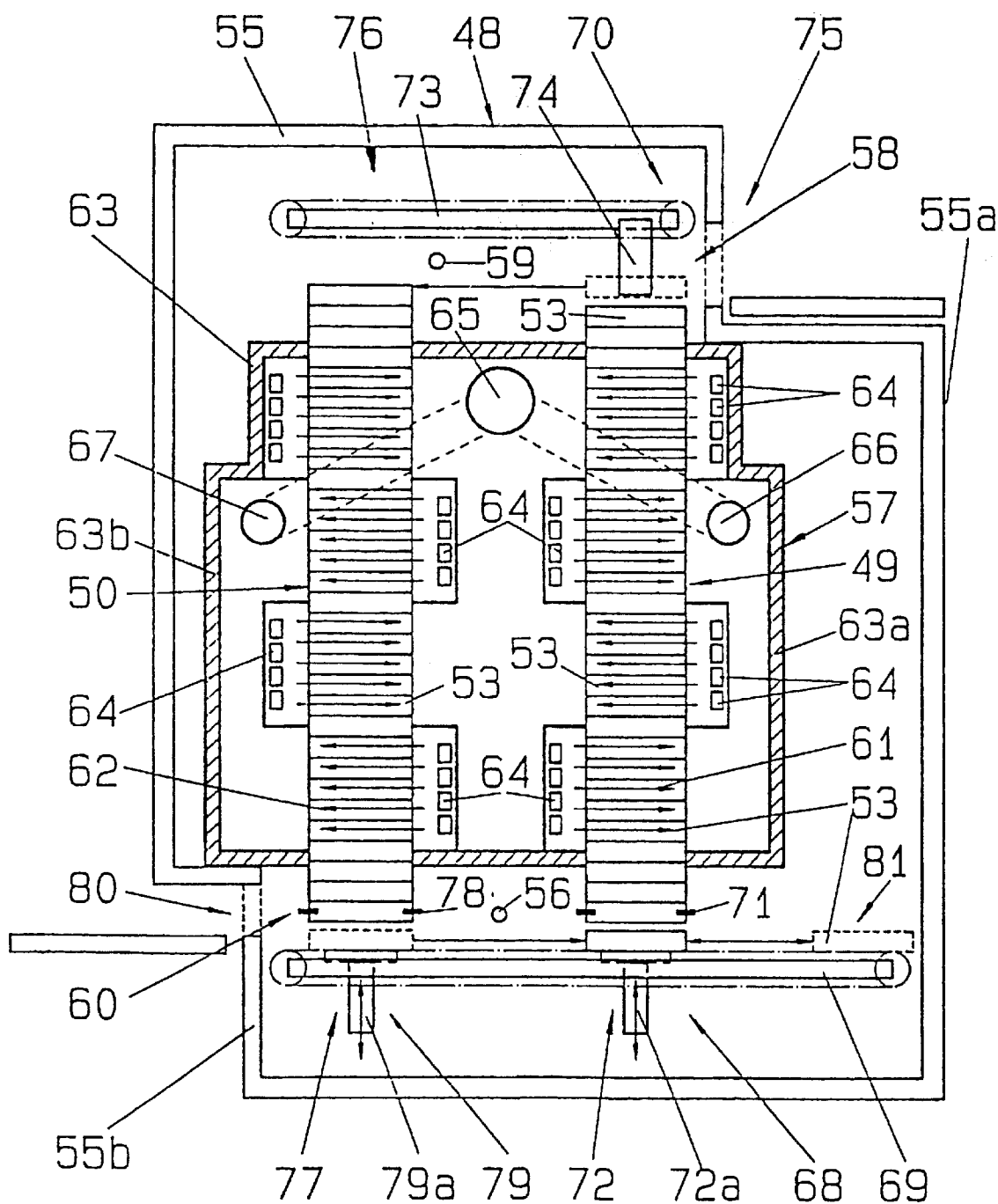

FIG. 2 shows a baking oven 48 to be heated with gas, with two vertical transport paths 49, 50 running in opposite directions, for the production of thin-walled shaped bodies produced in baking molds which can open and close, each consisting of two mold halves which determine the outer configuration and the wall thickness of the thin-walled shaped body.

In order to form the baking molds which can open and close (FIG. 8) on their upper, respectively lower stacking surfaces 51, respectively 52, stackable baking sheet units 53, which can be laterally connected in pairs are provided, which are heated from the inside through heating channels and are designed at their top sides 53a as lower baking mold halves, and at their bottom sides 53b as upper baking mold halves. These baking sheet units 53 correspond substantially with the baking sheet units 2 described in FIG. 1 in relation to the baking oven 1, and in addition are provided at two opposite edges 53c, respectively 53d, with lockable and again releasable locking devices 54, for rigidly connecting the two baking sheet units 53 lying on top of each other with their stacking surfaces 51, 52.

The stackable baking sheet units 53 which can be rigidly connected in pairs are transported in the baking oven 48 shown in FIG. 2 within the outer heat-insulating lining 55 of the baking oven 48 in a closed cycle. This cycle comprises a first upwards leading transport path 49, at whose initial bottom portion the baking sheet units 53 are stacked on top of each other for forming closed baking molds and at whose upper end the baking sheet units 53 are again separated for opening the baking molds. This first vertical transport path 49 for the closed baking molds leads from a bottom loading station 56 through a vertical baking shaft 57 to an upper removal station 58. From the upper removal station 58 the separated baking sheet units 53 are transferred to a second downwards leading transport path 50 leading running in the opposite direction to the first transport path 49, at whose top initial portion the baking sheet units 53 are again stacked on top of each other in order to form closed baking molds, and at whose bottom end the baking sheet units 53 are again separated, in order to open the baking molds. This second vertical transport path 50 for the closed baking molds leads from a top loading station 59 through the vertical baking shaft 57 to a bottom removal station 60. From the bottom removal station 60 the separated baking sheet units 53 are transported back to the first vertical upwards leading transport path 49.

The two vertical transport paths 49, 50 running in opposite directions and their continuously replenished stacks 61, 62, each consisting of superimposed baking sheet units 53, are arranged next to each other in the baking oven 48 and traverse the vertical baking shaft 57. In FIG. 2 the first upwards leading transport path 49 with the first stack 61 of the baking oven is shown to the right, and the vertical downwards leading transport path 50 with the second stack 62 of the baking oven is shown to the left.

In both transport paths 49, 50 the closed baking molds and the baking sheet units 53 forming the same are transported in opposite directions through the shaft 57, in continuously replenished stacks 61, respectively 62. The baking shaft 57 is outwards insulated within the baking oven 48 by a heat-insulating shell 63. Within the baking shaft 57, along both stacks 61, 62, gas burners 64 are arranged vertically one above the other. In each stack 61, 62 the gas burners 64 are arranged alternately on opposite sides of the stack 61, 62. The heating gases produced by them flow through the heating channels of the baking sheet units 53 to the respective stacks 61, 62, thereby heating the baking molds with the therein enclosed pre-products in the respective stack 61, 62. On the rear wall of the baking shaft 57 a central exhaust opening 65 and two lateral exhaust openings 66, 67 are provided, through which the heating gases escaping from the heating channels 54 of the baking sheet units and from the baking molds lying between the closed baking sheet units 53 can leave the baking shaft 57. The central exhaust opening 65 is arranged between the two stacks 61, respectively 62 and a side wall 63a of the baking shaft 57 and to the neighboring stacks 61, respectively 62 a lateral exhaust opening 66, respectively 67 is assigned.

The first stack 61 is constantly newly formed underneath the baking shaft 57 by a bottom stacking device 68 from separate baking sheet units 53 brought on by a lower horizontal conveyor 69 and above the baking shaft 57 continuously separated into individual baking sheet units 53 by an upper separating device 70. The bottom stacking device 68 corresponds to the stacking device 24 of the baking oven 1 of FIG. 1 and, just like it, has a holding device 71 assigned to the bottom end of the stack 61 for holding the first stack 61, and a lifting device 72 arranged below the first stack 61 for lifting the baking sheet unit 53 to be integrated from below in the first stack 61 and for lifting the entire first stack 61. The upper separating device 70 provides a grip head 74 supported by the upper horizontal conveyor 73 of the baking oven 48, which lifts the respective uppermost baking sheet unit 53 from the first stack 61 and transports it to the upper initial portion of the downwards leading second transport path 50.

In the first transport path 49, shaped bodies are baked from the respective pre-product applied to the top side 53*a* of the stackable baking sheet units 53 in the baking molds traversing the first stack 61, which in the upper removal station 58 of the baking oven 48 are removed from the upper side of the first stack 61 for instance by means of a suction head (not illustrated) and are transported to an upper discharge station 75 arranged close to the first stack 61, through which shaped bodies baked in the first stack 61 are discharged from the baking oven 48.

The second stack 62 is constantly replenished above the baking shaft 57 by a stacking device 76 from the baking sheet units 53 separated at the first stack 61, and underneath the baking shaft 57 continuously separated into individual baking sheet units 53 by means of a separating device 77. At the upper end of the second stack 62 the top side of its uppermost baking sheet unit is loaded with pre-product by the upper loading station 59 of the second transport path 50. Subsequently a baking sheet unit 53 removed from the stack 61 by the grip head 74 of the upper horizontal conveyor 73 is positioned as a new baking sheet unit 53 from above on the uppermost baking sheet unit of the second stack 62, and rigidly connected with the same by locking the lateral locking devices 54 (FIGS. 8–11) common to both superimposed baking sheet units 53. The locking device 54 rigidly connecting the two neighboring baking sheet units 53 are released, before the respective baking sheet units 53 reach the bottom end of the second stack 62, and there are then separated by the lower separating device 77 and deposited on the lower horizontal conveyor 69, which transports the separated baking sheet units 53 to the bottom loading station 56 of the first transport path 49. The lower separating station 77 has a holding device 78 assigned to the bottom end of the stack 62 for holding the second stack 62 and a lifting device 79 arranged underneath the second stack 62 for lowering the entire second stack and for lowering the baking sheet units 53 downwards separated from the second stack 62.

In the second transport path 50 the pre-product loaded in the upper loading station 59 of the baking oven 48 on the respective top side 52*a* of the stackable baking sheet units 53 are baked into shaped bodies in the baking molds traversing the second stack 62, which are removed in the lower removal station 60 of the baking oven 48 from the top side 53*a* of the respective baking sheet unit 53 deposited on the lower horizontal conveyor 69, for instance by means of a suction head (not illustrated) and are transported to a discharge station 80 arranged close to the lower end of the second stack 62, wherein the shaped bodies baked in the second stack 62 are discharged from the baking oven 48.

The upper horizontal conveyor 73 of the baking oven 48 with its grip head 74 is part of the upper separating device 70 of the first transport path 49, as well as of the upper stacking device 76 of the second transport path 50.

The lower horizontal conveyor 69 arranged underneath the baking shaft 57 extends laterally beyond the bottom ends of both stacks 61, 62, up to the lateral wall 55*a*, respectively 55*b* of the baking oven 1 adjacent to stack 61, respectively 62. In the second stack 62 the lower horizontal conveyor 69 extends to the discharge station 80 for the shaped bodies baked in the second stack 62. At the first stack 61 the lower horizontal conveyor 69 extends to a discharge station 81 for the stackable baking sheet units 53, to which a maintenance door (not illustrated) is assigned in the side wall 55*a* of the baking oven 48.

The discharge station 81 for the stackable baking sheet units 53 makes it possible that a baking sheet unit 53, which at the lower end of the second stack 62 was deposited by the lower separating device 77 on the lower horizontal conveyor 69, can be transported by means of the lower horizontal conveyor 68 passing the bottom ends of both stacks 61, 62 to the discharge station 81, and be discharged from the baking oven 48 through the same. After the cleaning or maintenance of the baking sheet unit 53, the latter can be reintroduced into the baking oven 48 through the discharge station 81 for stackable baking sheet units 53, and transported to the lower stacking device 68 of the first stack 61 by the lower horizontal conveyor 69. The discharge station 81 for the stackable baking sheets 53 makes it possible the replace individual baking sheet units 53 of the baking oven 48 with other baking sheet units 53, and thereby to reset the baking oven 48 for the production of another thin-walled shaped body, without having to dismount and take apart the baking oven 48 or parts of the baking oven 48. So for instance stackable baking sheet units 53 for the production of flat layers can be replaced with ones for the production of shallow trays or low cups.

Figure 8:
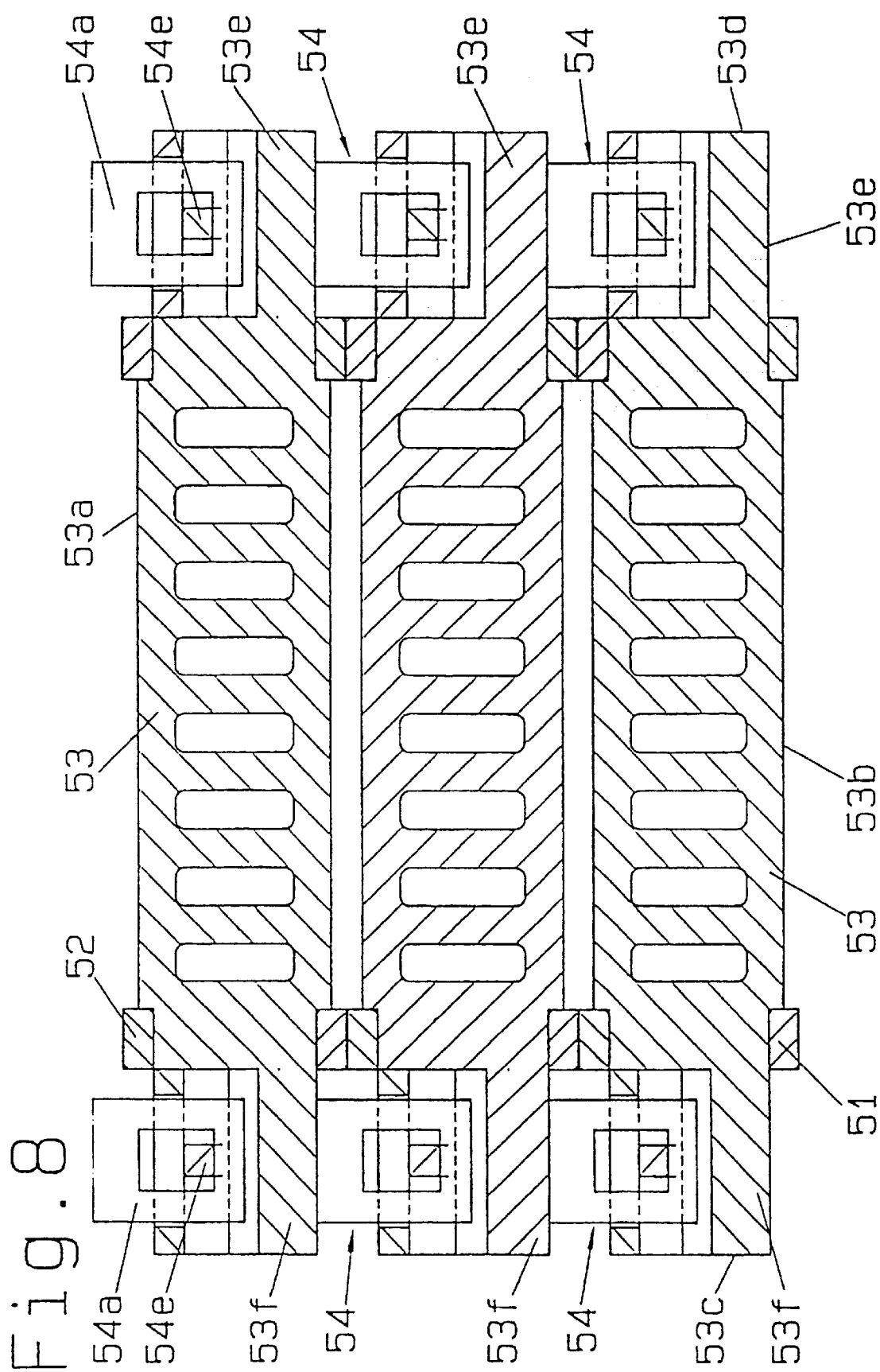

The stackable baking sheet units 53 of the baking oven 48 of FIG. 2 carry on each of two mutually opposed edges sides 53*c*, respectively 53*d* (FIGS. 8, 10, 11) laterally projecting locking segments 53*e*, respectively 53*f*, which when the baking sheet units 53 are stacked on top of each other, lie on top of each other in mutual alignment. Each locking segment 53*e*, respectively 53*f* of a baking sheet unit 53 carries on its top side the bottom part of a locking device 54 for locking the baking mold limited by the baking sheet unit 53, and on its underside the top part of the locking device 54 for locking the baking mold limited by the bottom side 53*b* of the baking sheet unit 53. The top part has a rectangular eye 54*a* with a horizontal hole 54*b* projecting vertically downwards from the underside of the respective locking segment 53*e*, respectively 53*f*. The bottom part has on the upper side of each locking segment 53*e*, respectively 53*f* an upwards open receiving slot 54*c* for the eye 54*a*, and inside the locking segment 53*e*, respectively 53*f*, a sidewards running working slot 54*d* which is upwardly open, wherein a horizontally movable pin 54*e* with a wedge-like point 54*f* is received. When two baking sheet units 53 are stacked on top of each other, in each locking device 54 the eye 54*a* attached to the locking segment 53*e*, respectively 53*f* of the upper baking sheet unit 53 is slid into the receiving slot 54*c* formed on the locking segments 53*e*, respectively 53*f* of the lower baking sheet unit 53. For rigidly connecting the two baking sheet units 53, it is then only necessary to push the pin 54*e* with its wedge-like point 54*f*, by means of an external actuating device (not illustrated) into the eye 54*a*, until the upper baking sheet unit 53 is clamped together with the lower baking sheet unit 53. (FIGS. 8, 10 and 11)

Figure 9:
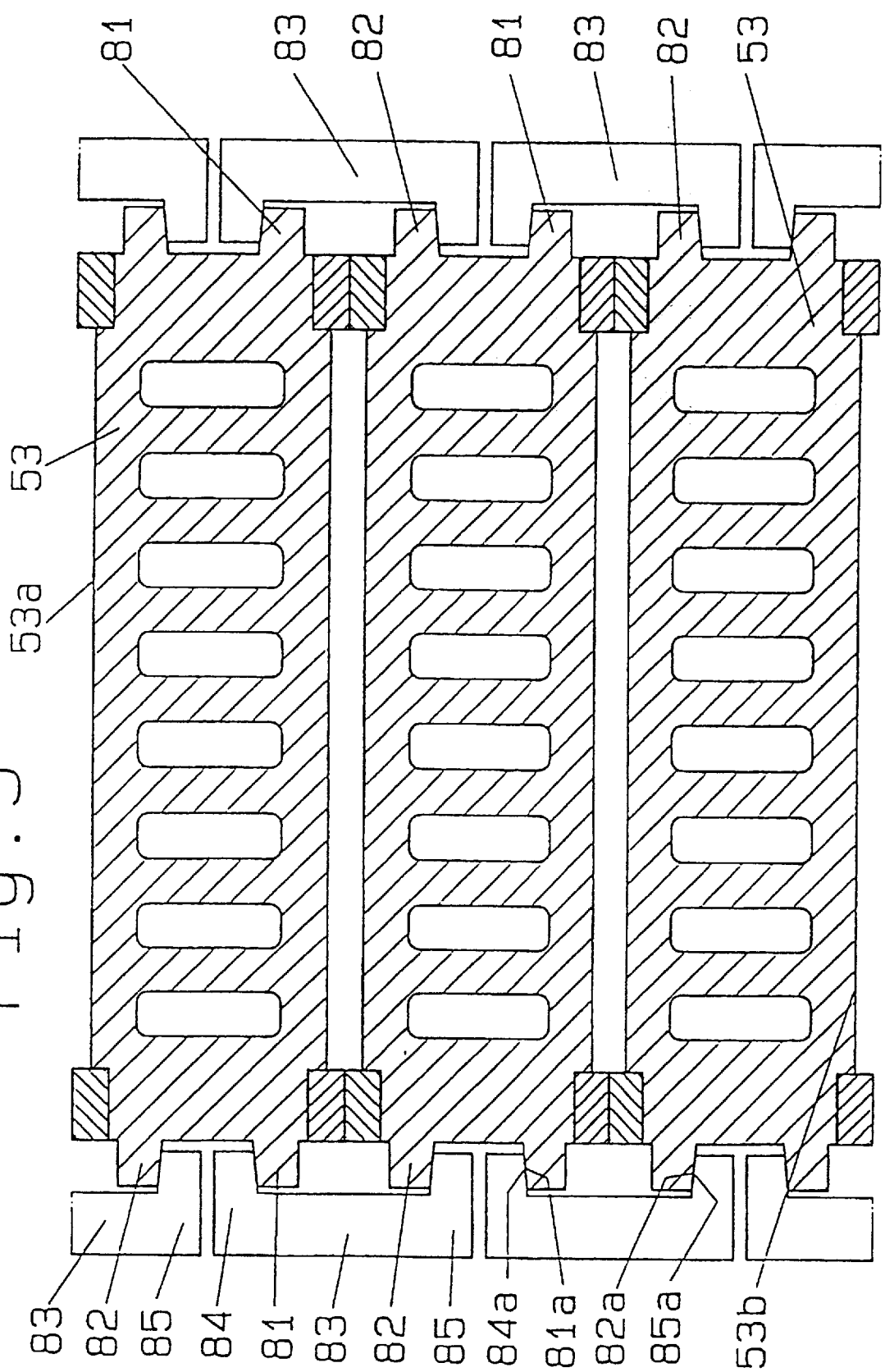
FIG. 9 a section of a vertical stack formed by baking sheet units stacked on top of each other, wherein the baking sheet units are rigidly connected within the stack by means of self-locking clamping devices applied from the outside to two respectively adjacent baking sheet units, FIG. 10 a locking device attached to two superimposed baking sheet units and rigidly connecting the same, in cross section, FIG. 11 a longitudinal section through the locking device of FIG. 10, FIG. 12 a holding device arranged at the bottom end of a vertical transport path for the production of thin-walled shaped bodies, for supporting a vertical stack of stackable baking sheet units seen from above, FIG. 13 a side view of the holding device of FIG. 12, FIG. 14 a section through a baking oven with two transport paths running in opposite directions for the production of thin-walled shaped bodies, paths formed by continuously replenished stacks of closed baking mold units lying loosely on top of each other, FIG. 15 a cross section through a closed baking mold unit, wherein the two baking sheets lying on top of each other with their frontal sides are rigidly connected to each other on mutually opposite sides by a respective locking device mounted on the two baking sheets, FIG. 16 a cross section through a closed baking mold, wherein the two baking sheets lying on top of each other with their frontal sides are rigidly connected to each other on mutually opposite sides by means of a self-locking clamping device applied from the outside to both baking sheet, FIG. 17 a section of a vertical stack consisting of closed baking mold units stacked on top of each other, whose stackable baking sheets are rigidly connected to each other by means of their lateral locking devices, FIG. 18 a lateral locking device of a closed baking mold in cross section, and FIG. 19 a longitudinal section through the locking device of FIG. 18.

The stackable baking sheet units 53 can also be provided as shown in FIG. 9 at the mutually opposite edges sides with upper locking segments 81 assigned to their top sides 53*a* and with lower locking segments 82 assigned to their bottom sides 53*b*. The upper locking segments 81 are provided at their undersides with lower engagement surfaces 81a for a self-locking clamping device 83, and the lower locking segments 82 are provided at their upper sides with upper engagement surfaces 82*a* for the self-locking clamping device 83. When two baking sheet units 53 are stacked on top of each other, the lower locking segments 82 of the upper baking sheet unit 53 lie over the upper locking segments 81 of the lower baking sheet unit 53. In order to rigidly connect the two baking sheet units 53, the self-locking clamping devices basically designed as C-shaped brackets 83 are pushed over the superimposed locking segments 81, 82 of the two baking sheet units 53. Each bracket 83 is pushed simultaneously from the outside with the mutually facing clamping segments 84*a*, 84*b* provided at its ends 84, 85 onto the upper engagement surface 82*a* of the lower locking segments 82 of the upper baking sheet unit 53 and onto the lower engagement surface 81*a* of the upper locking segment 81 of the lower baking sheet unit 53. The mutually facing clamping segments 84*a*, 85*a* of the bracket 83 and the two engagement surfaces 81*a*, 82*a* facing away from each other of the cooperating locking segments 81, 82 of the superimposed baking sheet units 53 form together a force-locking and self-locking frictional engagement. The bracket 83 is moved with its clamping segments 84*a*, respectively 85*a* in this force-locking self-locking frictional engagement along both engagement surfaces 82*a*, respectively 81*a* of the locking segments 82 and 81, until at first the motion play required for the sliding of the bracket 83 is eliminated, and then a desired prestress force is applied on both superimposed baking sheet units 53 due to the elastic deformation of the bracket 83. (FIG. 9) In the baking oven 48 of FIG. 2 the thin-walled shaped bodies are produced in baking molds which open and close and are formed by stackable baking sheet units 53, which are designed on their top and bottom sides as baking mold halves and which can be rigidly interconnected in pairs by locking devices 54 or clamping devices 83. These baking sheet units 53 pass in two oppositely running vertical transport paths 49, 50 through a respective stack 61, 62 which is continuously replenished, in that baking molds formed by baking sheet units 53 connected to each other in pairs are transported through the baking shaft 57, while the baking sheet units are stacked on top of each other in the initial portion of the stack 61, respectively 62 and are again separated at the end of the stack 61, respectively 62. Each stack 61, respectively 62 is supported at the bottom by a holding device 71, respectively 78 and is lifted and then again lowered by a lifting device 72, respectively 79 arranged thereunder, while at its lower end a new baking sheet unit 53 is added, respectively the lowermost baking sheet unit 53 is removed. At the upper end of the respective stack 61, 62, the addition of a new baking sheet unit 53, respectively the removal of the uppermost baking sheet unit 53 can be performed respectively by lifting or lowering the stack 61, respectively 62. The lifting motion and the lowering motion of the respective stack 61, 62 can be also used at its upper end for the addition of a new baking sheet unit 53, respectively for the removal of the uppermost baking sheet unit 53.

The first stack 61 forming the transport path 49 leading vertically upwards in the baking oven 48 consists of superimposed baking sheet units 53 which are integrated one after the other into the first stack 61 due to successive stacking processes of the lower stacking device 68 and, after travelling through the first stack 61 and the baking stack 57, are again removed from the first stack 61 by the separating device 72 at the top and of the first stack 61.

With each stacking process one new baking sheet unit 53, which has already been loaded with the pre-product on its top side 53*a*, is integrated from underneath into the first stack 61. The new baking sheet unit 53 is transported by the lower horizontal conveyor 69 under the bottom end of the first stack 61 and, by means of the ram 72*a* of the lifting device 72 arranged at the bottom, is lifted from the lower horizontal conveyor 69 towards the bottom end of the first stack 61 and pressed with its top side 53*a* against the bottom side of the first stack 61. Subsequently the new baking sheet unit 53, together with the first stack 61 resting thereon, is further lifted by the ram 72*a* of the lifting device 72 and the first stack 61 with its heretofore lowermost baking sheet unit 53 is lifted from the horizontal holding bolt of the thereto assigned holding device 71. The holding bolts 27 and 28 (FIG. 12) are pulled out from the heretofore lowermost baking sheet unit 53 of the first stack 61 due to the fact that their supporting carriages are pulled apart horizontally. The first stack 61 is further lifted by the ram 72*a* of the lifting device 72, until the lateral holding openings of the new and now lowermost baking sheet unit 53 of the first stack 61 are directed towards the horizontal holding bolts of the holding device 71. Now the two carriages of the holding device 71 are pushed together and the holding bolts are pushed into the holding openings of the new lowermost baking sheet unit 53 of the first stack 61. Subsequently the ram 72*a* of the lifting device 72 is lowered to its initial bottom position, whereby it first deposits the first stack 61 on the holding bolts of the holding device 71, before it is lowered alone below the transport level of the lower horizontal conveyor 69. Subsequently the lower horizontal conveyor transports the next baking sheet unit 53 which on its top side 53*a* has already been loaded with the pre-product under the bottom end of the first stack 61 and the next stacking process starts.

During each stacking process, the already loaded lower baking mold half formed on the top side 53*a* of the baking sheet unit 53 to be integrated is pushed from below with its upwards pointing sealing strips against the downwards pointing sealing strips of the baking mold formed on the bottom side 53*b* of the lowermost baking sheet unit 53 of the first stack 61, and both mold halves form a closed baking mold.

With each stacking process at the bottom end of the first stack 61 a new closed baking mold is formed, whose hollow mold space is defined upwards and downwards by the mutually facing baking surfaces of the two lowermost baking sheet units 53 of the first stack 61, and laterally by the superimposed sealing strips of these two baking sheet units. This hollow mold space is completely closed, except for the steam slots 11 provided in the horizontally mutually facing sealing strips 7 and 8. The shapeless mass enclosed in the hollow mold space due to the closing of the baking mold during the stacking process is baked into thin-walled shaped body formed like a flat layer, while the hollow mold space, together with the baking sheet units 53 delimiting it, travels stepwise upwards in the first stack 61 through the baking shaft 57. During this baking process, the shapeless mass is foamed by the baking gases generated therein and distributed through the hollow mold space, before the baking gases leave the hollow mold space through the steam slots and escape from the closed baking mold into the baking shaft 57. The inner pressure generated during baking inside the hollow mold space, which increases rapidly in the initial phase and after a short time decreases again rapidly, is counteracted by the weight of the respective part of the first stack 61 lying on top of the hollow mold space. The hollow mold space travels upwards in the first stack 61 by one level with each new stacking process, and the part of the first stack 61 lying on top of it becomes smaller and lighter with each baking sheet unit 53 removed at its top end. During the entire baking process, the inner pressure generated in the hollow mold space is always clearly smaller than the pressure exerted from above on the hollow mold space by the weight of the part of the first stack 61 lying on top of it. This is achieved due to the high weight of the stack 61, which is determined by the weight of the individual baking sheet units 53 and by the number of the baking sheet units 53 stacked on top of each other.

At the top end of the first stack 61 the hollow mold space is kept closed only by the weight of the baking sheet unit 53 bordering it on the top and, when this baking sheet unit 53 is lifted while the first stack 61 is being dismantled, it is also opened. For the separation of the baking sheet units 53 at the top end of the first stack 61, the gripper 74 of the upper horizontal conveyor 73 is passed over the top end of the first stack 61 and kept on standby until the first stack 61 is lifted to its uppermost position during a stacking process performed by the lifting device 72 arranged beneath the stack. Then the gripper head 74 seizes the uppermost baking sheet unit 53 of the first stack 61 and holds it, while the first stack 61 is again lowered by the lifting device 72 and the heretofore second to uppermost, and now the uppermost baking sheet unit 53 is removed downwards from the baking sheet unit 53 held by the gripper head 74. As a result the baking mold previously formed by the two uppermost baking sheet units 53 of the first stack 61 is opened, whereby the baked shaped body is left lying on the top side of the now uppermost baking sheet unit 53 of the first stack 61 and is removed from there, while the gripper head 74 transports the removed baking sheet unit 53 to the upper end of second stack 62. The gripper head 74 of the upper horizontal conveyor 73 is again passed over the top end of the first stack 61, before the same is lifted again to its uppermost position by its lifting device 72 and its next separation process starts.

When the overall height of the baking oven is limited, the height available for the respective stack could be too small for constantly maintaining the weight of the stack portion resting on the baking mold all the way through the vertically upwards leading transport path, so that it can be bigger than the inner pressure acting on the mold halves of the baking mold during the baking process. In order to be able to maintain the stackable baking sheet units in such a baking oven with shortened stack height closed the bottom end of the shortened stack has an actuation device, which at each stacking process locks, tightens the locking devices, respectively clamping devices common to both the new baking sheet unit and the lowermost baking sheet unit of the stack.

In a shortened stack the stacking process takes place somewhat differently from the one in a stack with sufficient height. The new baking sheet unit loaded on its top surface with pre-product is transported by the lower horizontal conveyor underneath the lower end of the shortened stack. The lifting device arranged underneath the shortened stack lifts the new baking sheet units from the lower horizontal conveyor with its lifting ram and presses them from below against the underside of the stack, which is kept in place at its lowermost baking sheet unit by the thereto assigned holding device. As soon as the new baking sheet unit lies with its top side against underside of the lowermost baking sheet unit of the stack, the locking devices, respectively clamping devices common to both baking sheet units are locked, respectively tightened by the actuating device, and thereby the new baking sheet unit is integrated in the stack as its new lowermost baking sheet unit. Subsequently the holding device of the stack is released from the heretofore lowermost baking sheet unit of the stack, the stack with its new lowermost baking sheet unit is lifted by the lifting device up to the holding device, and the holding device engages with the new lowermost baking sheet unit of the stack and the latter is held until the next stacking process starts.

The second stack 62 forming the vertically downwards leading transport path 50 of the baking oven 48, consists of superimposed baking sheet units 53, which at its upper end are integrated one after the other into the second stack 62, due to a succession of stacking processes of the upper stacking device 76 and, after travelling through the second stack 62 and the baking shaft 57, are again removed one after the other at the bottom end of the second stack 62 by means of the lower separating device 77.

With each stacking process a baking sheet unit 53 removed from the first stack 61 is integrated from above into the second stack 62. The grip head 74 of the upper horizontal conveyor 73 positions the new baking sheet unit 53 with its bottom side 53b on the top side 53a loaded with pre-product of the uppermost baking sheet unit 53 of the second stack 62. Thereby the upper mold half formed on the bottom side 53b of the uppermost baking sheet unit 53 to be integrated is positioned with its downwards pointing sealing strips from above onto the upwards point sealing strips of the lower mold halves already loaded with pre-product formed on the top side 53a of the uppermost baking sheet unit 53 of the second stack 62. As soon as the two baking sheet units 53 lie against each other with their mutually facing sealing strips, respectively stacking surfaces 51, 52, the locking devices 54, respectively clamping devices 83 common to both baking sheet units 53 are locked, respectively tightened. Thereby the two baking sheet units 53 forming a closed baking mold are rigidly interconnected and the new baking sheet unit 53 is integrated into the second stack 62.

The closed baking mold created by the stacking process has a hollow mold space which is completely closed, except for the steam slots 11 built in the sealing strips which face each other horizontally, and is kept closed against the inner pressure generating therein during baking by means of the locked locking devices 54, respectively the tightened clamping devices 83. This baking mold together with the two baking sheet units 53 by which it is formed and the locking devices 54, respectively clamping devices 83 rigidly interconnecting the same, travels downwards in the second stack 62 with each further stacking process by one level, and thereby stepwise through the baking shaft 57. While passing through the baking shaft 57, the shapeless mass, enclosed in the hollow mold space when the baking mold is closed during the stacking process, is baked into a thin-walled shaped body formed as a flat layer. During this baking process, the shapeless mass is foamed by the therein generated baking gases and distributed throughout the hollow mold space, before the baking gases leave the hollow mold space through the steam slots, flowing from the closed baking mold into the baking shaft 57. Before the baking mold reaches the lowermost position in the second stack 62 and the two baking sheet units 53 forming the same become the last and the one before last baking sheet units of the second stack 62, the locking devices 54, respectively clamping devices 83 are released. During the dismantling of the second stack 62 by the lower separating device 77, the last baking sheet unit 53 of the second stack 62 is detached from the one before last baking sheet unit 53 and by opening the baking mold is lowered away from the one before last baking sheet unit 53. The thin-walled shaped body produced in this baking mold is left lying on the top side 53a of the lowered baking sheet unit 53.

During the dismantling of the second stack 62, the latter is seized at the bottom side of its last baking sheet unit 53 by the ram 79a of lifting device 79 arranged underneath and lifted by the lateral holding pins of its assigned holding device 78. Due to their horizontally moving apart support carriages, the holding pins are pulled out from the last baking sheet unit 53 of the second stack 62. Subsequently the second stack 62 is lowered by the lifting device 79, until the lateral holding openings of the one before last baking sheet unit 53 are aligned with the horizontal holding pins of the holding device 78. Now the two carriages of the holding device 76 are pushed together and the holding pins are pushed into the holding openings of the one but last baking sheet unit 53 of the second stack 62. Subsequently the ram 79a of the lifting device 79 is lowered to its lower initial position. Thereby first the second stack 62 with its one before last baking sheet unit 53 is positioned on the holding pins of the holding device 78, and then its heretofore last baking sheet unit 53 is detached from the one before last baking sheet unit 53, and the separated former last baking sheet unit 53 is further lowered by the ram 79a of the lifting device 79, and together with the baked shaped body lying on its top side 53a is deposited on the lower horizontal conveyor 69. In the lower removal station 60 of the baking oven 48, the baked shaped body is removed from this baking sheet unit 53 and discharged from the baking oven 48 via the lower discharge station 80. The baking sheet unit 53 removed from the second stack 62 is transported by the lower horizontal conveyor 69 first to the lower loading station 56 of the baking oven 48, where it is again loaded with pre-product, and then to the lower end of the first stack 61.

FIG. 14 shows a baking oven 86 with two vertical transport paths 87, 88 running in opposite directions for the production of thin-walled shaped bodies, which are formed by continuously replenished stacks of superimposed, closed baking mold units 89.

For the formation of the openable and closable baking molds baking plates 90, 91 usable only on one side are provided, which at their frontal sides 90a (FIG. 15), respectively 91a, are built as upper, respectively lower mold halves, and at their rear sides 90b, respectively 91b are provided with reinforcement ribs 92, 93, between which heating channels 94, 96 are formed.

In baking plates used in gas-heated baking ovens, these heating channels are traversed by hot gases in the baking shaft. In baking plates for electrically heated baking ovens, electric heating elements are arranged in the heating channels.

The baking plates 90, 91 have at their frontal sides 90a, 91a and at their rear sides 90b, 91b mutually facing stacking surfaces 96a, 96b, 97a, 97b, by means of which they can be stacked on top of each other, frontal side 90a to frontal side 91a, rear side 90b to rear side 91b. In order to form a closed baking mold, the stackable baking plates 90, 91 are positioned one on top of the other in pairs with their frontal sides 90a, 91a and rigidly connected at mutually opposite frontal sides of the baking mold, by means of thereon arranged locking devices 98 or self-locking clamping devices 99 (FIG. 16) positioned from the outside, to form a closed baking mold unit, which is transported as a rigid body through the respective vertical transport path 87, 88.

Figure 17:
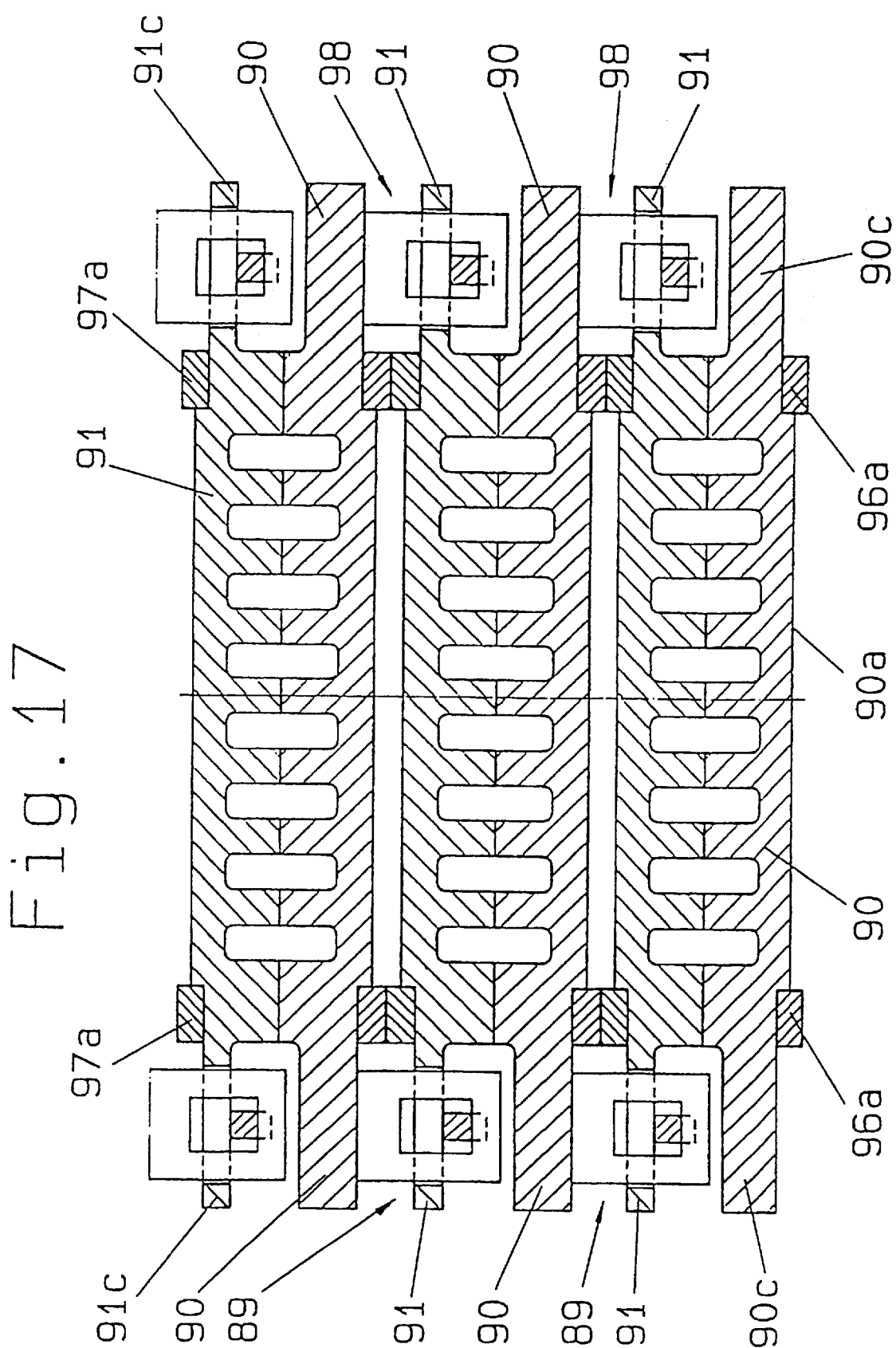

The stackable baking plates 90, 91 usable only on one side are designed for the production of a certain thin-walled shaped body. Each baking mold consists of a top baking plate 90, whose front face 90a (FIG. 17) is shaped as the upper mold half of the baking mold, and a lower baking plate 91 whose frontal side 91a is shaped as the lower mold half of the baking mold.

Baking molds for the production of flat rectangular layers are formed by stackable baking plates, which have a substantially rectangular plate body, on whose frontal side a substantially flat rectangular baking surface is formed, which is limited by lateral sealing strips, wherein the stacking surfaces of the frontal sides of the baking plate are integrated. Two baking plates lying on top of each other with their frontal sides are set on top of each other with the sealing strips of their mutually facing baking mold halves and form a closed baking mold, which is completely closed, except for the steam channels arranged in one of the sealing strips.

Baking molds for the production of round, triangular, pentagonal of fan-shaped flat layers can be made of stackable baking plates, which have a substantially rectangular body, which at its frontal side carries a round, triangular, pentagonal, or fan-like baking surface, which is limited by lateral sealing strips wherein the stacking surfaces of the frontal sides are integrated.

Baking molds for the production of round, triangular, pentagonal or fan-like flat layers can be formed by baking plates, each having a parallellepipedic plate body with a base shaped correspondingly to the round, triangular, pentagonal of fan-like shape of the layers to be produced.

Baking molds for the production of thin-walled shaped bodies which are upwardly open shallow rectangular trays consist of stackable baking plates with substantially rectangular plate bodies. The upper baking plates have each a baking surface at their frontal sides, which is provided with raised portions corresponding to the configuration of the tray and limited by lateral sealing strips corresponding to the contour of the tray and which contain the stacking surface of the frontal side of the upper baking plate. The lower baking plates each have at their frontal sides a baking surface provided with depressions corresponding to the configuration of the tray and is limited by lateral sealing strips matching the contour of the tray and which contain the stacking surface of the frontal side of the lower baking plate.

Baking molds for the production of thin-walled shaped bodies which are shaped as flat layers without defined edges, are formed by stackable baking plates which have a parallellepipedic plate body having on its frontal side a flat baking surface which corresponding to the respective contour of the flat layers to be produced, and outside of the same carries spacers determining the wall thickness of the shaped body, which are integrated in the frontal side in stacking surface.

Figure 19:
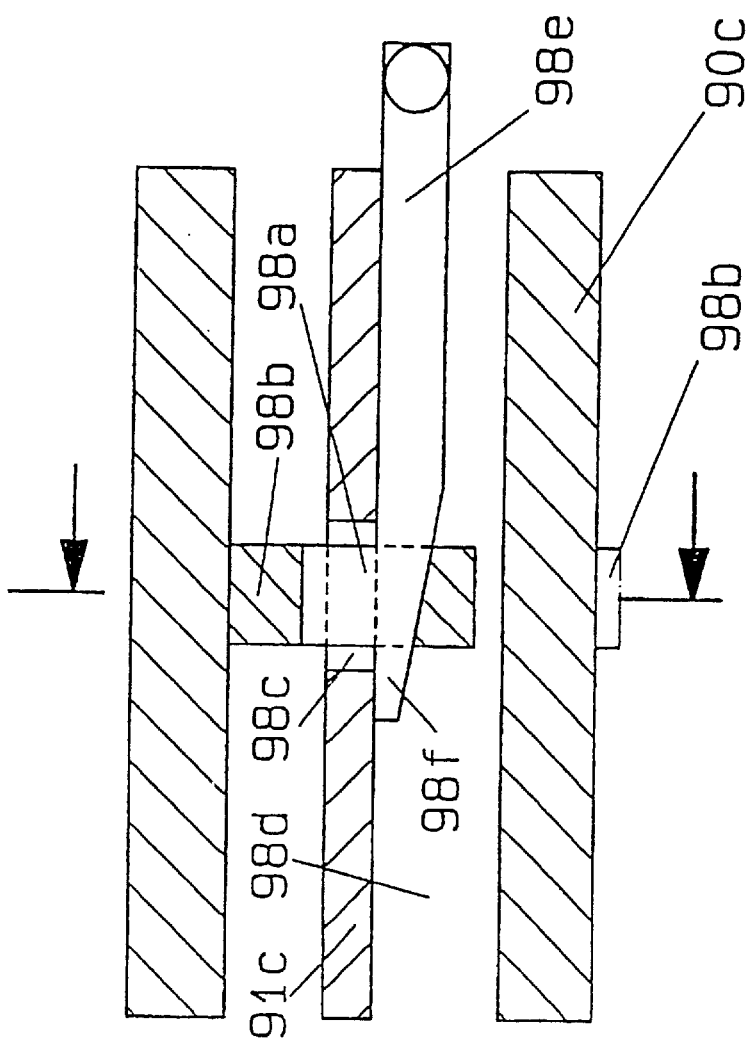
Figure 18:
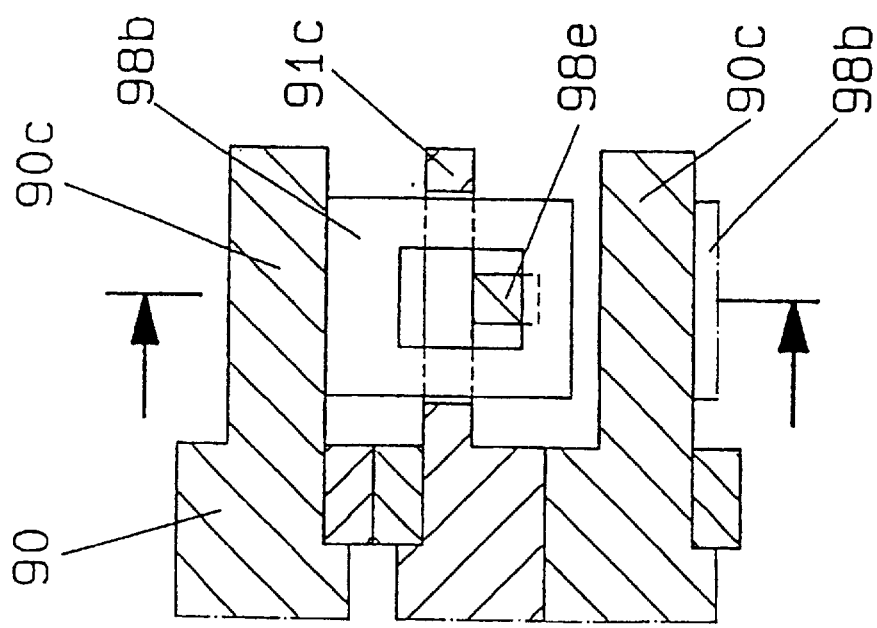

FIG. 15 shows a stackable closed baking mold unit 89 formed by two stackable baking plates 90, 91, with baking plates 90, 91 rigidly connected to each other laterally. The baking plates 90, 91 are each provided at two mutually opposite edges sides of the baking mold unit with spaced apart locking devices 98, whose upper parts is formed on a locking segment 90c of the upper baking plate 90 and whose lower part is formed on a lower locking segment 91c of the lower baking plate 91. In each locking device the upper part is designed as a rectangular eye 98b provided with a horizontal hole 98a, which projects vertically downwards from the underside of the locking segment 90c of the upper baking plate 90. The lower part comprises an upwards open vertical receiving slot 98c for the eye 98b, which is formed on the upper side of the locking segment 91c of the lower baking plate 91 and inside the locking segment 91c has a laterally open working slot 98d running transversely to the eye 98b, wherein a horizontally slidable pin 98e with a wedge-shaped point 98f is received. When the two baking plates 90, 91 are stacked on top of each other, each eye 98b of the upper baking plate 90 slides into the receiving slot 98c of the lower baking plate 91. For the rigid connection of the two baking plates 90, 91, each time the pin 98e of the locking device 98 is pushed with its wedge-like point 98f (FIG. 19) into the eye 98a by an external actuating device (not illustrated), until the upper baking plate 90 is tightened to the lower baking plate 91 and both baking plates 90, 91 form a closed baking mold 89, which can be transported and stacked as a rigid body.

FIG. 16 shows a further embodiment of a closed baking mold unit 100 which can be transported and stacked as a rigid body. The baking mold unit 100 is formed by two stackable baking plates 101, 102 which correspond substantially to the baking plate units 90, 91 of FIG. 15. The stackable baking plate units 101, 102 are rigidly connected at opposite frontal sides of the baking mold unit 100 by self-locking clamping devices 99. Each clamping device 99 consists of two clamping segments 103, 104 arranged on the upper, respectively lower baking plate 101, 102 and of one basically C-shaped bracket 105, which with its two ends 106, 107 designed as a clamping segments can be pushed over in force-locking and self-locking frictional engagement onto two clamping segments 103, 104 of the baking plates 101, 102. The clamping segment 103 of the upper baking plate 101 has on its upper side a clamping surface 103a and the clamping segment 104 of the lower baking plate 102 has at its underside a lower clamping surface 104a. The bracket 105 carries at both its ends 106, 107, mutually facing clamping surfaces 106a, 107a. When the two baking plates 101, 102 are stacked on top of each other, the locking segments 103 of the upper baking plate 101 lie over the locking segments 104 of the lower baking plate 102. For the rigid connection of the baking plates 101, 102, the bracket 105 with its mutually facing clamping surfaces 106a, 107a is positioned onto the oppositely facing clamping surfaces 103a, 104a of the locking segments 103, 104 of the two baking plates 101, 102, and these clamping surfaces are brought into a force-locking and self-locking frictional engagement. The bracket 105 is moved with its clamping surfaces 106a, 107a along the clamping surfaces 103a, 104a of the two baking plates 101, 102, until the motion play necessary for sliding the bracket 105 is eliminated and then a desired prestress force is applied to both superimposed baking plates 101, 102 and the two baking plates 101, 102 form a closed baking mold unit 100, which can be transported and stacked as a rigid body.

In the baking oven of FIG. 14 the thin-walled shaped bodies are baked in the baking mold units formed by stackable baking plates 90, 91, respectively 101, 102, which run through a closed cycle. This cycle consists of two spaced apart vertical transport paths 87, 88 running in opposite directions, for the baking mold units 98, 100 and two horizontal transport path 108, 109 connecting the vertical transport paths 87, 88, which are arranged one above the other and run in opposite directions, wherein the baking mold units are transported from one vertical transport path to the other, thereby travelling through a sequence of working stations where they are successively opened, emptied, reloaded and again closed.

In the vertically upwards leading transport path 87, the closed baking mold units 98, 100 travel through a first stack, consisting of loosely superimposed closed baking mold units 98, 100, which are integrated one after the other in the first stack by a lower stacking device in successive stacking steps, and after traversing the first stack and the baking shaft are successively removed from the first stack by an upper separating device.

In the vertically downwards leading transport path 88 the closed baking mold units 98, 100 travel through a second stack which also consists of loosely superimposed closed baking mold units, which at the upper stack end are integrated one after the other into the second stack by an upper stacking device in successive stacking steps, and after traversing the second stack and the baking shaft are again removed from the second stack at the lower end of the second stack by a lower separating device.

What is claimed is:

1. An apparatus for baking thin-walled shaped bodies, the apparatus comprising:

a baking shaft defining adjacent up and down paths;

a respective stack of pairs of cavity-forming baking plates in the shaft at each of the paths;

heating means in the shaft for heating the stacks between upper and lower ends thereof;

lower transport means for conveying plates from the lower end of the down-path stack to the lower end of the up-path stack;

upper transport means for conveying plates from the upper end of the up-path stack to the upper end of the down-path stack; and upper and lower filling and stripping means above the respective upper and lower transport means for depositing a bakable preproduct on the plates and for removing a baked product from the plates.

2. The baking apparatus defined in claim 1, further comprising means for locking the plates pair vertically together as they move between the ends of the down-path stack.

3. The baking apparatus defined in claim 1 wherein the lower transport means includes a lower conveyor extending from the lower end of the down-path stack to the lower end of the up-path stack, means for picking the plates off the lower end of the down-path stack and thereby lowering the entire down-path stack a step, and for setting the picked-off plates on the lower conveyor for conveyance to below the up-path stack, and means for lifting the plates off the lower conveyor and pressing them against the lower end of the up-path stack so as to raise the entire up-path stack.

4. The baking apparatus defined in claim 1 wherein the upper transport means includes an upper conveyor extending from the upper end of the up-path stack to the upper end of the down-path stack, means for transferring plates from the upper end of the up-path stack to the upper conveyor for conveyance to above the down-path stack, and means for transferring the plates from the upper conveyor to the upper end of the down-path stack.

5. The baking apparatus defined in claim 1 wherein each baking plate has an upper and a lower surface and upwardly and downwardly projecting rims bounding the respective surfaces, whereby each plate forms an upper half of one mold cavity and a lower half of another mold cavity.

6. The baking apparatus defined in claim 1 wherein each baking plate has an inner surface and is formed with a vertically projecting rim bounding the respective inner surface and with an oppositely directed outer surface, whereby the plates can be inverted so that each forms a top or bottom half of a mold cavity and bears with its outer surface in the stack on the outer surface of an adjacent plate.

7. The baking apparatus defined in claim 6, further comprising means for locking the plates vertically together as they move between the ends of the stacks.

8. The baking apparatus defined in claim 1 wherein the plates are formed with throughgoing passages, the heating means forcing hot gases through the passages in the stacks.

9. The baking apparatus defined in claim 8, further comprising means for locking the plates of each pair vertically together as they move between the ends of the stacks.

* * * * *